US008825484B2

(12) United States Patent
Yamada et al.

(10) Patent No.: US 8,825,484 B2
(45) Date of Patent: Sep. 2, 2014

(54) CHARACTER INPUT APPARATUS EQUIPPED WITH AUTO-COMPLETE FUNCTION, METHOD OF CONTROLLING THE CHARACTER INPUT APPARATUS, AND STORAGE MEDIUM

(75) Inventors: Masayuki Yamada, Kawasaki (JP); Masayuki Sato, Tokyo (JP)

(73) Assignee: Canon Kabushiki Kaisha (JP)

( * ) Notice: Subject to any disclaimer, the term of this patent is extended or adjusted under 35 U.S.C. 154(b) by 250 days.

(21) Appl. No.: 13/242,667

(22) Filed: Sep. 23, 2011

(65) Prior Publication Data

US 2012/0084075 A1    Apr. 5, 2012

(30) Foreign Application Priority Data

Sep. 30, 2010   (JP) ................................. 2010-221785

(51) Int. Cl.
| G10L 13/00 | (2006.01) |
| G10L 21/00 | (2013.01) |
| G10L 21/06 | (2013.01) |
| G10L 15/26 | (2006.01) |
| G10L 17/00 | (2013.01) |
| G06F 17/27 | (2006.01) |
| G06F 17/21 | (2006.01) |

(52) U.S. Cl.
USPC ............. 704/260; 704/10; 704/235; 704/246; 704/258; 704/270; 704/270.1; 704/275; 704/276; 704/9

(58) Field of Classification Search
USPC ............... 704/9, 10, 235, 246, 258, 260, 270, 704/270.1, 275, 276
See application file for complete search history.

(56) References Cited

U.S. PATENT DOCUMENTS

| 5,734,749 | A | * | 3/1998 | Yamada et al. ................ 382/187 |
| 5,761,689 | A | * | 6/1998 | Rayson et al. ................. 715/210 |
| 5,805,911 | A | * | 9/1998 | Miller ............................ 715/234 |

(Continued)

FOREIGN PATENT DOCUMENTS

| EP | 0 842 463 A1 | 5/1998 |
| JP | 09-288666 A | 11/1997 |

(Continued)

OTHER PUBLICATIONS

Berard C., Neimeijer D. Evaluating effort reduction through different word prediction systems. Proceedings of the IEEE International Conference on Systems, Man and Cybernetics, La Haye NL. vol. 3, pp. 2658-2663. Oct. 2004.*

(Continued)

Primary Examiner — Edgar Guerra-Erazo
(74) Attorney, Agent, or Firm — Rossi, Kimms & McDowell, LLP

(57) ABSTRACT

A character input apparatus which makes it possible to suppress degradation of use-friendliness in a case where a visually disabled user inputs characters using an auto-complete function. In the character string input apparatus, a character string to be input as a portion following a character string input by a user is predicted based on the character string input by the user, and the character string input by the user is completed using the predicted character string as a portion complementary thereto. In a voice guidance mode, information associated with a key selected by the user is read aloud by voice. When the voice guidance mode is enabled, the character string input apparatus disables the auto-complete function and performs control such that a character string cannot be automatically completed.

7 Claims, 19 Drawing Sheets

(56) References Cited

U.S. PATENT DOCUMENTS

| | | | |
|---|---|---|---|
| 6,011,554 A | 1/2000 | King et al. | |
| 6,377,965 B1* | 4/2002 | Hachamovitch et al. | 715/203 |
| 6,442,523 B1* | 8/2002 | Siegel | 704/270 |
| 6,556,841 B2* | 4/2003 | Yu | 455/556.1 |
| 6,564,213 B1* | 5/2003 | Ortega et al. | 1/1 |
| 6,624,803 B1* | 9/2003 | Vanderheiden et al. | 345/156 |
| 6,738,742 B2* | 5/2004 | Badt et al. | 704/270 |
| 6,813,603 B1* | 11/2004 | Groner et al. | 704/235 |
| 6,820,075 B2* | 11/2004 | Shanahan et al. | 715/205 |
| 6,882,337 B2* | 4/2005 | Shetter | 345/173 |
| 6,922,810 B1* | 7/2005 | Trower et al. | 715/256 |
| 6,938,035 B2* | 8/2005 | Driesch et al. | 1/1 |
| 7,003,446 B2* | 2/2006 | Trower et al. | 704/9 |
| 7,058,622 B1* | 6/2006 | Tedesco | 1/1 |
| 7,171,353 B2* | 1/2007 | Trower et al. | 704/9 |
| 7,177,797 B1* | 2/2007 | Micher et al. | 704/9 |
| 7,185,271 B2* | 2/2007 | Lee et al. | 715/226 |
| 7,228,229 B2* | 6/2007 | Odagawa et al. | 701/539 |
| 7,260,529 B1* | 8/2007 | Lengen | 704/235 |
| 7,318,198 B2* | 1/2008 | Sakayori et al. | 715/729 |
| 7,461,352 B2* | 12/2008 | Katsuranis | 715/800 |
| 7,487,145 B1* | 2/2009 | Gibbs et al. | 1/1 |
| 7,672,846 B2* | 3/2010 | Washio et al. | 704/251 |
| 7,679,534 B2* | 3/2010 | Kay et al. | 341/22 |
| 7,912,700 B2* | 3/2011 | Bower et al. | 704/9 |
| 7,970,612 B2* | 6/2011 | Han et al. | 704/251 |
| 2003/0036909 A1* | 2/2003 | Kato | 704/275 |
| 2003/0158735 A1* | 8/2003 | Yamada et al. | 704/260 |
| 2003/0212559 A1* | 11/2003 | Xie | 704/260 |
| 2004/0210442 A1* | 10/2004 | Glynn et al. | 704/275 |
| 2004/0225503 A1* | 11/2004 | Hollander et al. | 704/270 |
| 2004/0254928 A1* | 12/2004 | Vronay et al. | 707/5 |
| 2006/0095842 A1* | 5/2006 | Lehto | 715/532 |
| 2006/0146028 A1* | 7/2006 | Chang et al. | 345/169 |
| 2006/0265648 A1* | 11/2006 | Rainisto et al. | 715/534 |
| 2006/0265668 A1* | 11/2006 | Rainisto | 715/816 |
| 2006/0282575 A1* | 12/2006 | Schultz et al. | 710/62 |
| 2006/0293890 A1* | 12/2006 | Blair et al. | 704/235 |
| 2007/0050190 A1* | 3/2007 | Washio et al. | 704/249 |
| 2008/0306686 A1* | 12/2008 | Nakayama | 701/211 |
| 2009/0284471 A1* | 11/2009 | Longe et al. | 345/168 |
| 2010/0131447 A1* | 5/2010 | Creutz et al. | 706/52 |
| 2011/0141027 A1* | 6/2011 | Ghassabian | 345/168 |

FOREIGN PATENT DOCUMENTS

| | | |
|---|---|---|
| JP | 2003-016003 A | 1/2003 |
| JP | 2006-031273 A | 2/2006 |
| KR | 100436286 B1 | 6/2004 |
| WO | 2010/018577 A2 | 2/2010 |

OTHER PUBLICATIONS

Hollis Weber, "Taming Microsoft Word 2002", 122 Pages, published on Oct. 10, 2002.*

"Adjusting Settings Through Control Panel," Windows XP Narrator, 2002.*

Extended European Search Report issued in counterpart European Patent Application No. 11183033.7, dated Mar. 7, 2013.

Paulo Lagoa et al., BloNo: A New Mobile Text-Entry Interface for the Visually Impaired, INESC-ID/Technical Superior Institute, Lisbon Technical University, Universal Access in HCI, Part II, HCII 2007, LNCS 4555, pp. 908-917,2207. Cited in EESR issued in counterpart EP. 11183033.7, See NPL cite No. 1. © Springer-Verlag Berlin Heidelberg 2007.

Matthew N. Bonner et al. No-Look Notes: Accessible Eyes-Free Multi-touch Text Entry, GVU Center & School of Interactive Computing, Georgia Institute of Technology, Pervasive 210, LNCS 6030, pp. 409-426,2010, See NPL cite No. 1. © Springer-Verlag Berlin Heidelberg 2010.

Gerry Kennedy, Fact Sheet: Universal Access using Word Prediction, Gerry Kennedy © Mar. 2009. See NPL cite No. 1.

Korean Office Action for corresponding Kr Oct. 2011-0098880, mail date Jun. 26, 2014.

* cited by examiner

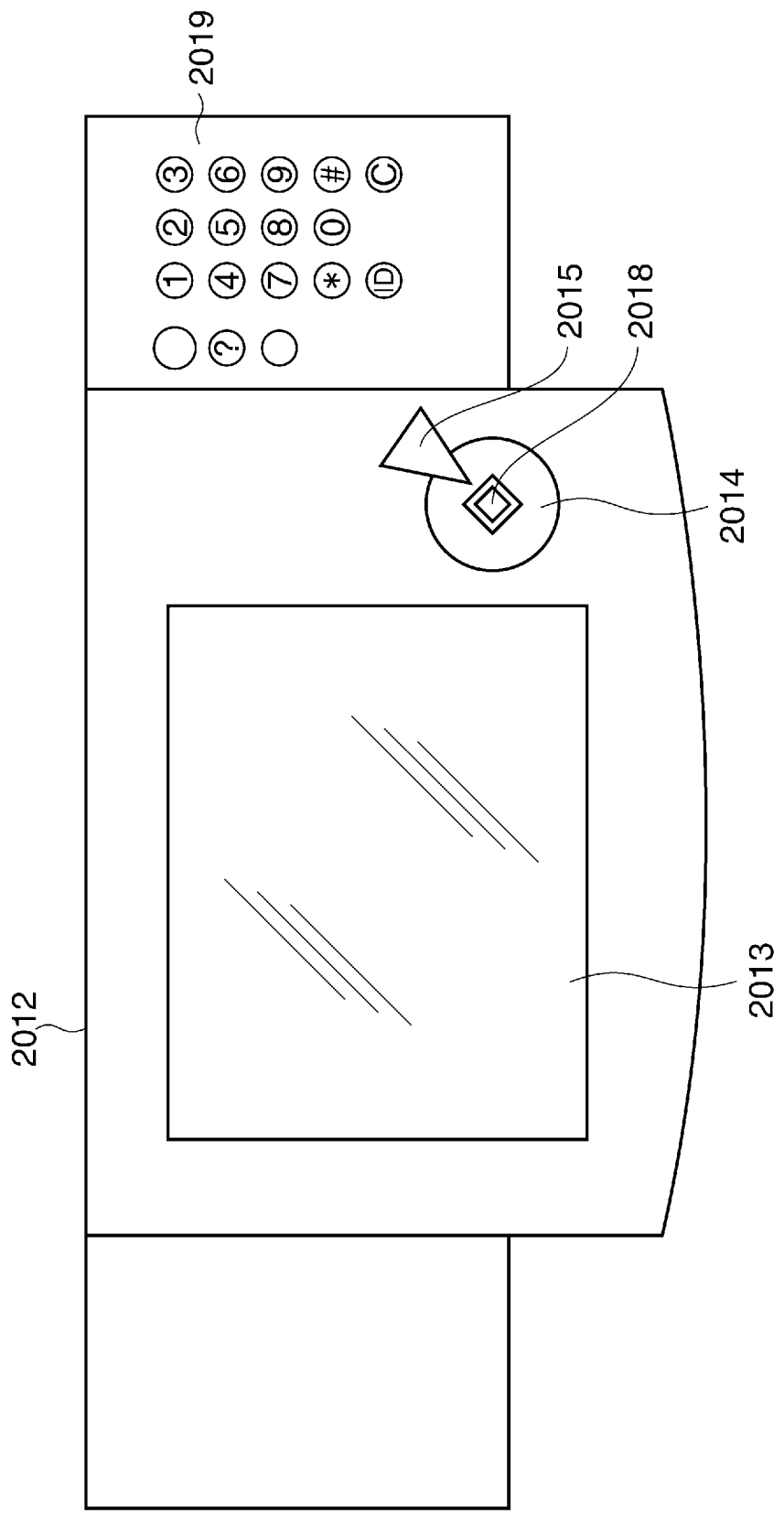

CHARACTER INPUT APPARATUS EQUIPPED WITH AUTO-COMPLETE FUNCTION, METHOD OF CONTROLLING THE CHARACTER INPUT APPARATUS, AND STORAGE MEDIUM

BACKGROUND OF THE INVENTION

1. Field of the Invention

The present invention relates to a character input apparatus equipped with an auto-complete function, a method of controlling the character input apparatus, and a storage medium.

2. Description of the Related Art

Conventionally, there has been proposed a character input apparatus in which in a voice guidance mode, a focused button on a screen displayed on a touch panel is operated by hardware keys (see Japanese Patent Laid-Open Publication No. 2006-31273). In this type of character input apparatus, when a user presses a predetermined hardware key, a focus set on a button on a touch panel is moved. Then, when another hardware key different from the predetermined hardware key is pressed, the character input apparatus executes a process assigned to the focused button. The process executed at this time is the same process as executed when the button is pressed via the touch panel. Further, in the case of moving the focus, the device notifies the user of information on a function assigned to the button focused anew, using voice guidance. This makes it possible for a visually disabled user to easily recognize the function assigned to the focused button.

Some character input apparatuses are equipped with a function of auto-complete. The auto-complete is a function that assists a user who desires to input a character string, such as an e-mail address, by searching e.g. an address book, input history, etc., in response to the user's input of a portion of the character string, to find character strings each having a leading portion thereof matching the input character string, and displaying the found character strings. For example, there has been proposed a character input apparatus which, immediately after a character string input by a user, automatically adds a character string of a completing suggestion for completing the input character string. Another character input apparatus has also been disclosed in which when a plurality of addresses each having a leading portion thereof matching a character string input by a user are found, the addresses are displayed as completing suggestions in the form of a menu such that the user can select a desired address from the menu (see Japanese Patent Laid-Open Publication No. 2003-16003). By using the auto-complete function, a user can input a desired character string without having to manually input the character string completely.

However, when a character string is completed by a portion complementary thereto by the auto-complete function, a visually disabled user who uses voice guidance cannot grasp what has occurred.

Particularly in the method in which immediately after a character string input by a user, a character string of a completing suggestion for completing the input character string is automatically added, if the character string having the character string of the completing suggestion added thereto is finally determined as it is, there is a fear that a character string different from the character string desired by the user is set.

Further, when a user cannot grasp a portion added by the auto-complete function, it is difficult for the user to properly correct the auto-completed character string. For example, even if the user desires to delete added characters and continue to input new characters, it is difficult to recognize how many characters should be deleted, so that the user cannot properly correct the auto-completed character string.

SUMMARY OF THE INVENTION

The present invention provides a mechanism which makes it possible to suppress degradation of user-friendliness in a case where a visually disabled user inputs characters using an auto-complete function.

In a first aspect of the present invention, there is provided a character input apparatus comprising a completing unit configured to predict, based on a character string formed by at least one character, which is input by a user, a character string formed by at least one character which is to be input as a portion following the character string input by the user, and complete the character string input by the user, by adding the predicted character string as a portion complementary thereto, a voice guidance unit configured to provide information associated with a key selected by the user, by voice guidance, and a control unit configured to be operable when the voice guidance unit is set to provide guidance, to control the completing unit not to perform completion of the input character string.

In a second aspect of the present invention, there is provided a character input apparatus comprising a completing unit configured to predict, based on a character string formed by at least one character, which is input by a user, a character string formed by at least one character which is to be input as a portion following the character input by the user, and complete the character string input by the user, by adding the predicted character string as a portion complementary thereto, and a voice control unit configured to read aloud the character string input by the user and the character string added by the completing unit in a manner distinguishable therebetween.

In a third aspect of the present invention, there is provided a method of controlling a character input apparatus, comprising predicting, based on a character string formed by at least one character, which is input by a user, a character string formed by at least one character which is to be input as a portion following the character string input by the user, and completing the character string input by the user, by adding the predicted character string as a portion complementary thereto, providing information associated with a key selected by the user, by voice guidance, and performing control, when voice guidance is set to be provided, not to perform completion of the input character string.

In a fourth aspect of the present invention, there is provided a non-transitory computer-readable storage medium storing a computer-executable program for causing a computer to execute a method of controlling a character input apparatus, wherein the method comprises predicting, based on a character string formed by at least one character, which is input by a user, a character string formed by at least one character which is to be input as a portion following the character string input by the user, and completing the character string input by the user, by adding the predicted character string as a portion complementary thereto, providing information associated with a key selected by the user, by voice guidance, and performing control, when voice guidance is set to be provided, not to perform completion of the input character string.

According to the present invention, it is possible to suppress degradation of user-friendliness in a case where a visually disabled user inputs characters using the auto-complete function.

The features and advantages of the invention will become more apparent from the following detailed description taken in conjunction with the accompanying drawings.

BRIEF DESCRIPTION OF THE DRAWINGS

FIG. 3 is a plan view of a console section appearing in FIG. 1.

FIGS. 4A and 4B are views illustrating in detail a ten-key pad appearing in FIG. 3, in which FIG. 4A shows functions in a normal operation mode, and FIG. 4B shows functions in a voice reading mode.

FIGS. 6A and 6B are views each illustrating an example of a new address input keyboard screen displayed on a LCD section appearing in FIG. 3, in which FIG. 6A shows an example of the new address input keyboard screen in a voice guidance mode, and FIG. 6B shows a state where a focus has been moved from the FIG. 6A state by key press.

FIGS. 8A and 8B are views useful in explaining a new address input keyboard screen displayed when an e-mail selection button appearing in FIG. 7 is pressed, in which FIG. 8A illustrates an example of the new address input keyboard screen except for input character button arrays, and FIG. 8B illustrates the example including the input character button arrays displayed in an area appearing in FIG. 8A.

FIGS. 9A to 9D are views useful in explaining an e-mail address displayed in an address display section appearing in FIGS. 8A and 8B, in which FIG. 9A shows a state where nothing has been displayed in the address display section, FIG. 9B shows a state where a first completing suggestion has been selected and displayed, FIG. 9C shows a state where a second completing suggestion has been selected and displayed, and FIG. 9D shows the address display section in a state where the auto-complete function has been disabled.

DESCRIPTION OF THE EMBODIMENTS

The present invention will now be described in detail below with reference to the accompanying drawings showing an embodiment thereof.

Figure 1:
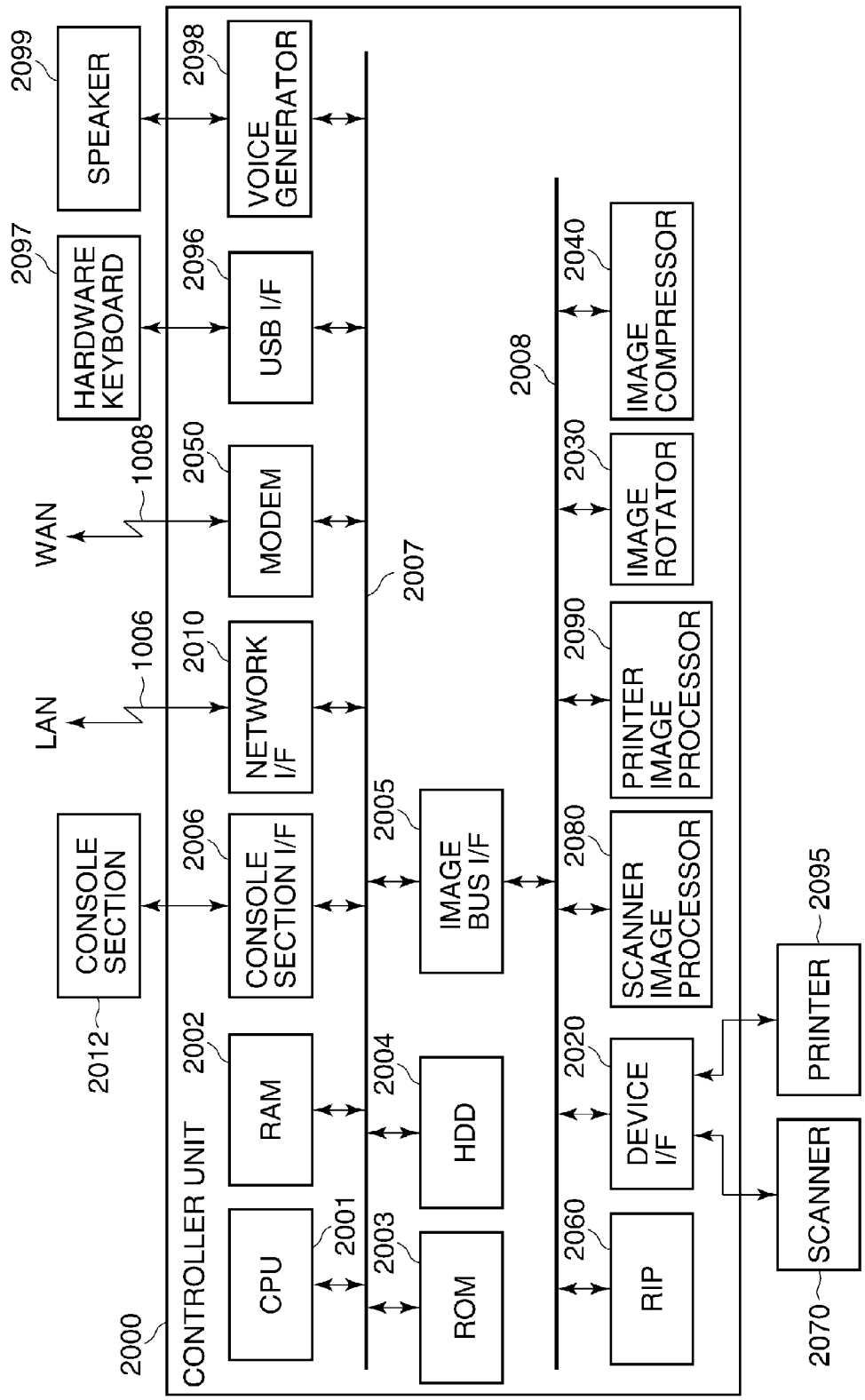
FIG. 1 is a block diagram of an image processing apparatus as an example of a character input apparatus according to an embodiment of the present invention.

FIG. 1 is a block diagram of an image processing apparatus as an example of a character input apparatus according to the embodiment of the present invention.

Referring to FIG. 1, the image processing apparatus has a controller unit 2000. The controller unit 2000 is connected to a scanner 2070 as an image input device and a printer 2095 as an image output device via a device interface 2020. The controller unit 2000 is also connected to a console section 2012 via a console section interface 2006. Further, the controller unit 2000 is connected to a LAN 1006 and a public communication line (WAN) 1008 to control input and output of image information and device information.

The controller unit 2000 has a CPU 2001, and the CPU 2001 starts an operating system (OS) by a boot program stored in a ROM 2003. The CPU 2001 carries out various processes by executing application programs stored in a hard disk drive (HDD) 2004, on the OS. A RAM 2002 provides a work area for the CPU 2001 and an image memory area for temporarily storing image data. The HDD 2004 stores the above-mentioned application programs and image data. Further, the RAM 2002 and the HDD 2004 store various kinds of data, flags, and so forth.

Figure 2:
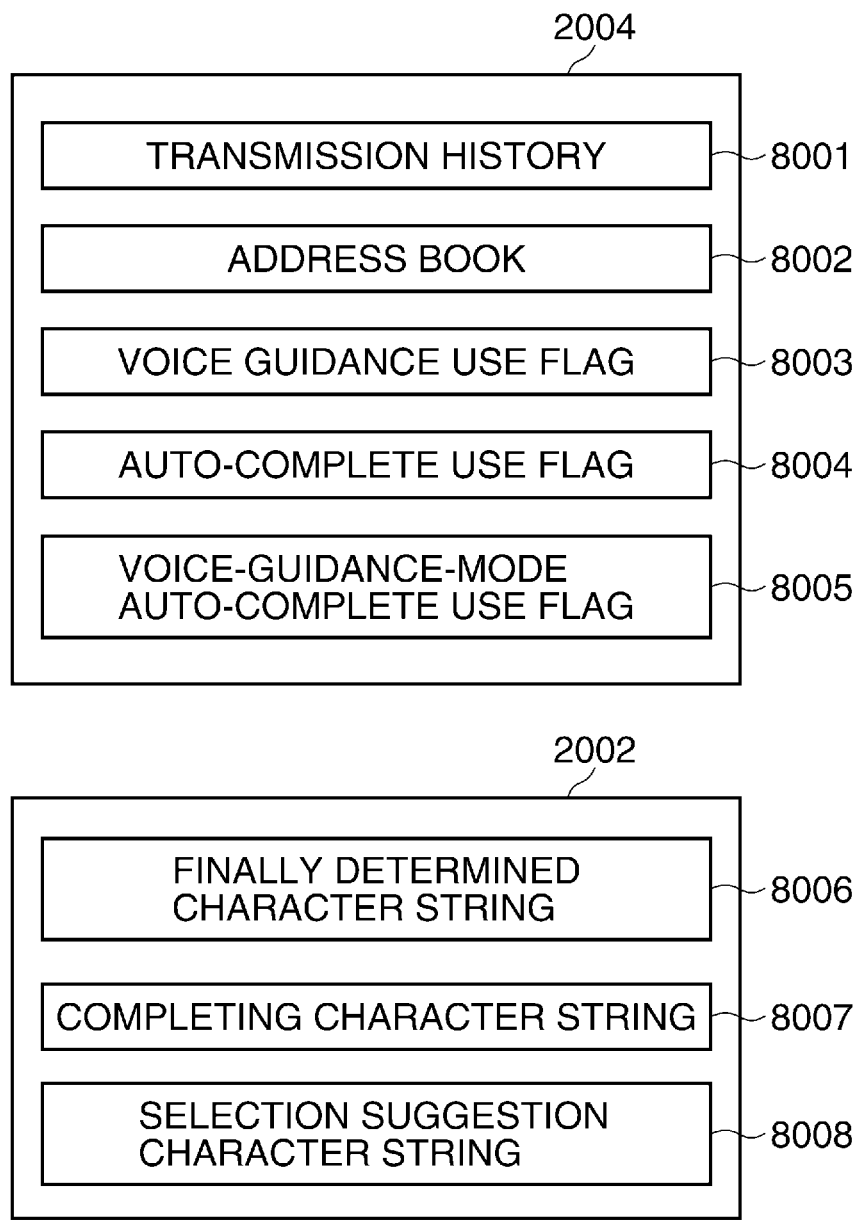
FIG. 2 is a diagram showing examples of flags and various kinds of data stored in a hard disk drive (HDD) and a RAM appearing in FIG. 1.

FIG. 2 is a diagram showing examples of the flags and the various kinds of data stored in the HDD 2004 and the RAM 2002 appearing in FIG. 1.

As shown in FIG. 2, the HDD 2004 stores transmission history 8001, an address book 8002, a voice guidance use flag 8003, an auto-complete use flag 8004, and a voice-guidance-mode auto-complete use flag 8005. On the other hand, the RAM 2002 stores a finally determined character string 8006, a completing character string 8007, and a selection suggestion character string 8008.

Referring again to FIG. 1, the CPU 2001 is connected to the ROM 2003 and the RAM 2002 via a system bus 2007. Further, the CPU 2001 is connected to the console section interface 2006, a network interface 2010, a modem 2050, a USB interface 2096, and an image bus interface 2005.

The console section interface 2006 provides interface with the console section 2012 having a touch panel, and outputs to the console section 2012 image data to be displayed on the same. Further, the console section interface 2006 delivers information input by a user via the console section 2012 to the CPU 2001.

The network interface 2010 is connected to the LAN 1006 to receive and deliver information from/to apparatuses on the LAN 1006 via the LAN 1006. The modem 2050 is connected to the public communication line 1008 to receive and deliver information via the public communication line 1008. The USB interface 2096 is connectable to a USB device, such as a hardware keyboard 2097. When the USB device is connected to the USB interface 2096, the USB interface 2096 communicates with the USB device according to a USB interface standard to acquire attributes of the USB device and notifies the CPU 2001 of the attributes. The CPU 2001 detects connection or disconnection of the USB device based on this attribute notification.

A voice generator 2098 comprises a sound chip, an amplifier, and so forth, and converts digital voice data to a voice signal. Then, the voice signal is output via a speaker 2099. In the present embodiment, the CPU 2001 issues a command to the voice generator 2098 to thereby perform voice control, but the voice generator 2098 may include its own CPU which performs voice control. The image bus interface 2005 serves as a bus bridge that connects between the system bus 2007 and an image bus 2008 for transferring image data at high speed, and converts data forms. The image bus 2008 comprises a PCI bus or an IEEE 1394.

On the image bus 2008, there are arranged a raster image processor (hereinafter referred to as "the RIP") 2060, the device interface 2020, a scanner image processor 2080, a printer image processor 2090, an image rotator 2030, and an image compressor 2040.

The RIP 2060 expands a PDL code into a bitmap image. The device interface 2020 is connected to the scanner 2070 and the printer 2095 to perform synchronous-to-asynchronous or asynchronous-to-synchronous conversion of image data. The scanner image processor 2080 corrects, processes, and edits input image data. The printer image processor 2090 performs correction, resolution conversion, etc. of image data to be printed out, according to the printer 2095. The image rotator 2030 rotates image data. The image compressor 2040 compresses or expands multi-valued image data by JPEG, and binary image data by JBIG, MMR or MH.

The controller unit 2000 constructed as above executes a copy job in which image data read by the scanner 2070 is printed using the printer 2095. Further, the controller unit 2000 executes a print job in which image data received from an external PC via the LAN 1006 is printed using the printer 2095. Furthermore, the controller unit 2000 executes a FAX print job in which image data received via the public communication line 1008 is printed using the printer 2095. Jobs executable by the image processing apparatus are not limited to the above-mentioned jobs. For example, the controller unit 2000 may be configured to be capable of executing a FAX transmission job in which image data read by the scanner 2070 is transmitted via the public communication line 1008. In addition, the controller unit 2000 may be configured to be capable of executing a storage job in which image data read by the scanner 2070 is stored in the HDD 2004.

FIG. 3 is a plan view of the console section 2012 appearing in FIG. 1.

As illustrated in FIG. 3, the console section 2012 comprises an LCD section 2013 and a ten-key pad 2019. The LCD section 2013 has a structure in which a touch panel sheet is attached to an LCD. The LCD section 2013 displays an operation screen (button operation screen), and when a button (touch key) displayed on the screen is pressed, position information of the button is transmitted to the CPU 2001. Note that in the present embodiment, software keys displayed on the LCD section 2013 are each referred to as a button.

A start key 2014 is used e.g. for starting an operation of reading an original image. In the center of the start key 2014, there is provided a green and red two-color LED 2018 which emits a green light or a red light to indicate whether or not a function of the start key 2014 is available. A stop key 2015 is operated to stop an operation being executed (e.g. print operation).

Figure 4A:
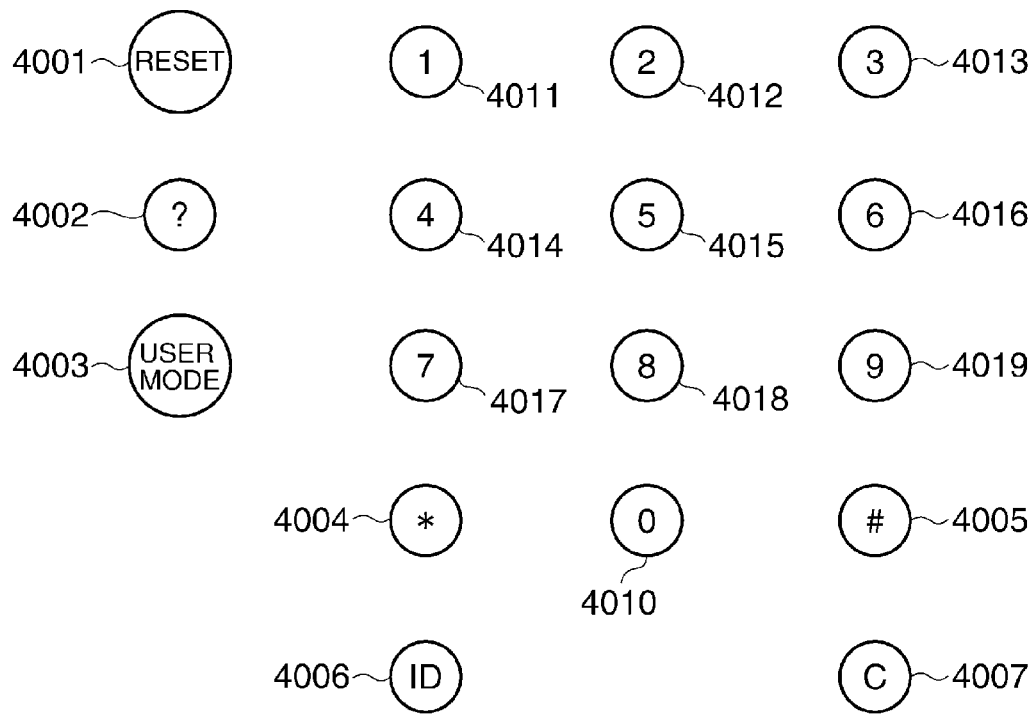
Figure 4B:
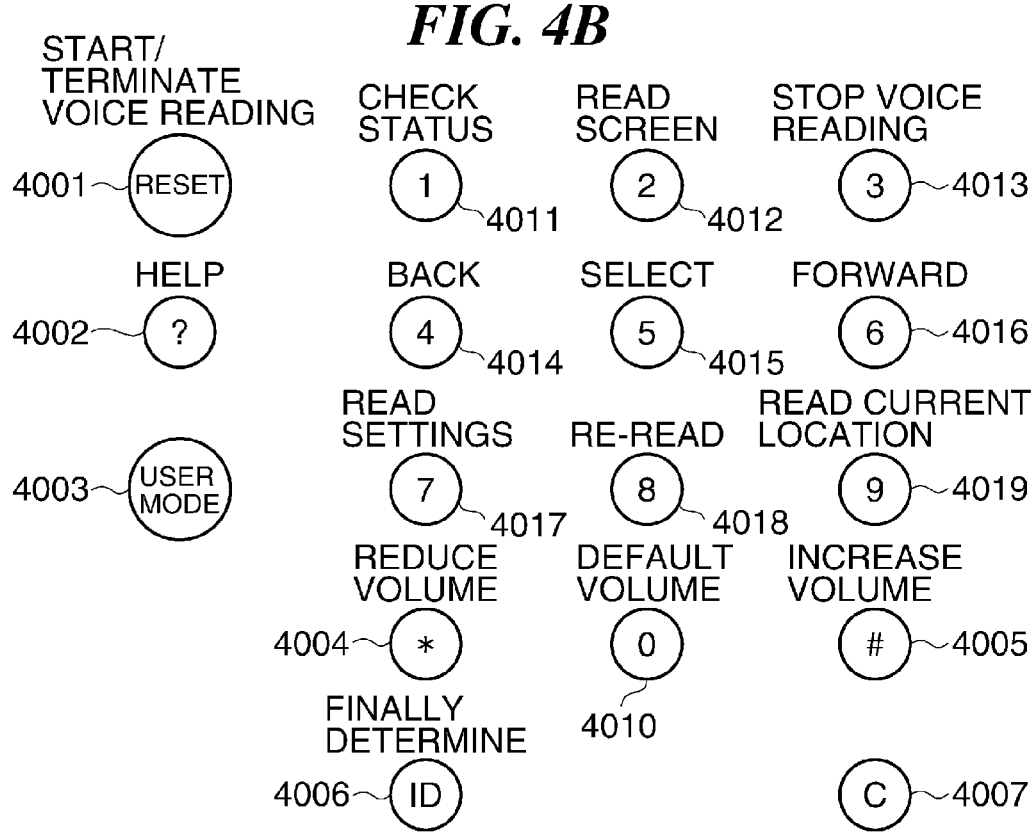

FIGS. 4A and 4B are views illustrating in detail the ten-key pad 2019 appearing in FIG. 3. FIG. 4A shows functions in a normal operation mode, and FIG. 4B shows functions in a voice reading mode.

Referring to FIG. 4A, on the ten-key pad 2019, there are arranged numeric keys, i.e. a "0" key 4010 to a "9" key 4019. Further, on the ten-key pad 2019, there are provided a reset key 4001, a "?" (guide) key 4002, a user mode key 4003, a "*" key 4004, a "#" key 4005, an ID key 4006, and a "C" (clear) key 4007. When one of the keys is pressed, the console section interface 2006 generates an associated predetermined key code and sends the key code to the CPU 2001 controlling the display of a screen via the system bus 2007. How to handle each key code is determined based on the operation specifications of each screen for which the key code is generated.

Further, as shown in FIG. 4B, each key is assigned a function to be used for voice reading, and a character string indicative of the function for voice reading is written close to the key. For example, a "2" key 4012 is assigned a function indicated by "READ SCREEN". Further, the reset key 4001 is assigned a function indicated by "START/TERMINATE VOICE READING", and the "0" key 4010 is assigned a function indicated by "DEFAULT VOLUME".

In the following description, the wording "a screen is displayed" or "a screen is opened" means that the CPU 2001 displays on the LCD section 2013 screen display data as an object to be displayed, according to screen control data. The screen display data and the screen control data are called from the HDD 2004 or the RAM 2002 by the CPU 2001. The screen display data is displayed on the LCD section 2013 via the console section interface 2006.

Further, the wording "the user selects . . . " means that the user presses a button or a list item displayed on a screen, thereby enabling the CPU 2001 to determine a process to be executed according to position information and screen control data sent from the LCD section 2013.

The image processing apparatus shown in FIG. 1 enables the user to set the use/non-use of a voice guidance function (also referred to as "the voice guidance" or "the voice guidance mode") and the use/non-use of an auto-complete function (also simply referred to as "the auto-complete"), as desired. Note that the auto-complete function is provided as a function of, when a character or a character string is input, predicting a character or a character string that will follow the input character or character string and adding the predicted character or character string to the input character or character string for completion thereof. For example, the auto-complete function operates such that in the process of inputting a character string, such as an e-mail address, when the user enters a leading portion of the character string, a search is made of an address book, input history, or the like, for a character string having a leading portion thereof matching the entered leading portion, and the partly entered character string is completed based on the found character string as a completing suggestion. When there are found a plurality of completing suggestions (predicted characters or character strings), the completing suggestions are displayed for the user to select one of the displayed completing suggestions.

Figure 5:
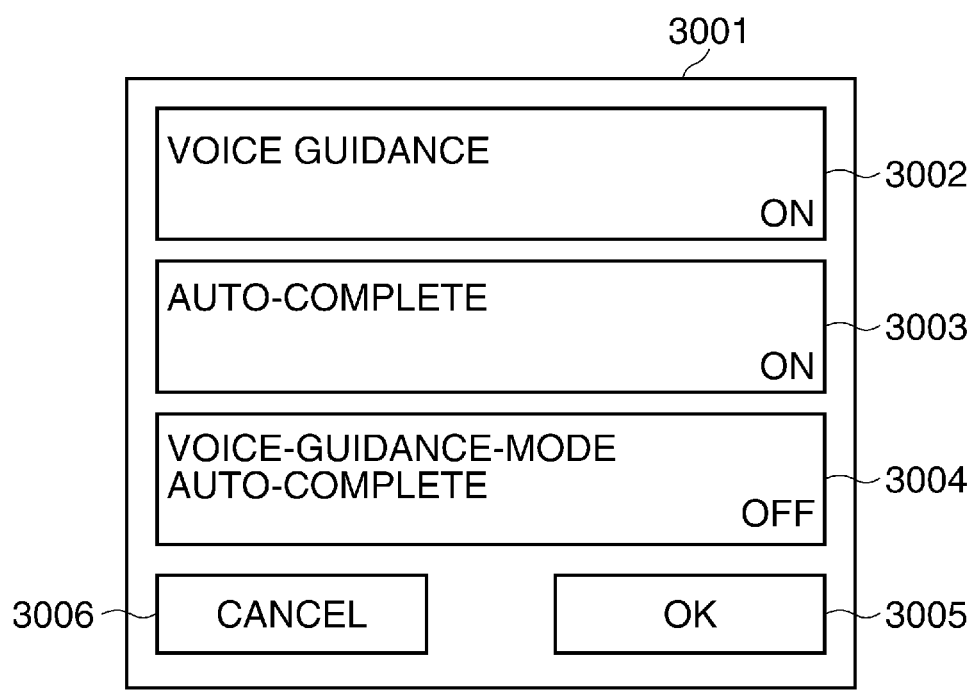
FIG. 5 is a view of a configuration screen for setting use or non-use of voice guidance and use or non-use of an auto-complete function of the image processing apparatus in FIG. 1.

FIG. 5 is a view of a configuration screen for setting use or non-use of the voice guidance and use or non-use of the auto-complete function of the image processing apparatus shown in FIG. 1.

The configuration screen illustrated in FIG. 5 is displayed on the LCD section 2013 when the user mode key 4003 appearing in FIGS. 4A and 4B is pressed. Referring to FIG. 5, when the user presses a button 3002 disposed on a dialog 3001, the voice guidance is toggled between use and non-use. Further, when buttons 3003 and 3004 are pressed by the user, the auto-complete and the voice-guidance-mode auto-complete are toggled between use and non-use, respectively. A toggle setting of each button is displayed as "On (use)" or "Off (non-use)" on the button. When an OK button 3005 is pressed, the settings of the use/non-use on the respective buttons 3002 to 3004 are stored as respective states of the voice guidance use flag 8003, the auto-complete use flag 8004, and the voice-guidance-mode auto-complete use flag 8005. On the other hand, when a cancel button 3006 is pressed, the configuration performed on the respective buttons 3002 to 3004 is canceled, and the flags are not changed.

Now, when the user keeps pressing the reset key 4001 (see FIG. 4) over a predetermined time period (i.e. performs long pressing the reset key 4001) with the voice guidance set to use as described above, the CPU 2001 shifts the operation mode to the voice guidance mode. In the voice guidance mode, a focus is displayed on the screen.

Figure 6A:
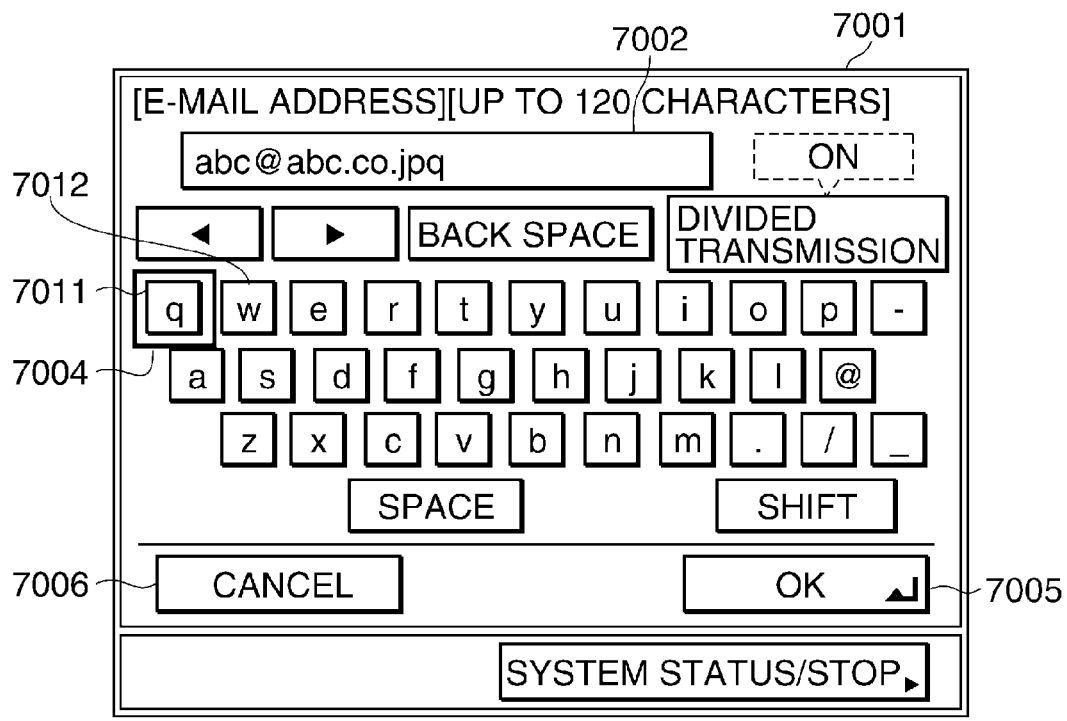
Figure 6B:
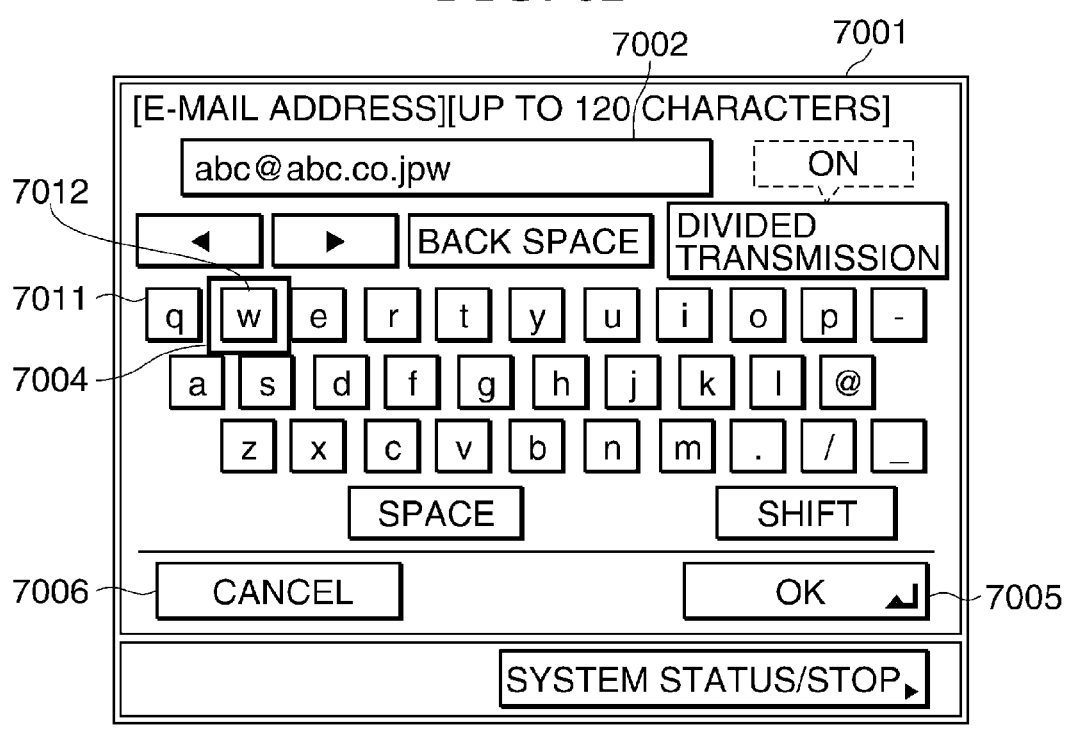

FIGS. 6A and 6B are views each illustrating an example of a new address input keyboard screen 7001 displayed on the LCD section 2013 appearing in FIG. 3. FIG. 6A shows an example of the new address input keyboard screen 7001 in the voice guidance mode, and FIG. 6B shows a state where the focus has been moved from the FIG. 6A state by key press.

When the image processing apparatus receives an instruction for inputting an e-mail address in the voice guidance mode, the new address input keyboard screen 7001 illustrated in FIG. 6A by way of example is displayed on the LCD section 2013 (see FIG. 3). In the FIG. 6A example, the focus 7004 is displayed on a "q" button 7011. In this case, the "q" button 7011 enclosed by the focus 7004 is focused.

Although in the FIG. 6A example, the focus 7004 is depicted as a frame enclosing the "q" button 7011, a different indication method may be employed e.g. in which the "q" button 7011 is color-reversed. In the voice guidance mode, the name of a focused button (the "q" button 7011 in the present example) or other information on the same is read by voice. In the case of reading aloud by voice, the CPU 2001 calls associated data for voice reading from the HDD 2004 and sends the data for voice reading to the voice generator 2098 (see FIG. 1), where voice data is generated. Then, a voice corresponding to the voice data is output from the speaker 2099. The data for voice reading includes male voice data and female voice data, and the male voice data and the female voice data are stored in the HDD 2004. The CPU 2001 selects a voice data item according to a situation, and sends the same to the voice generator 2098.

The CPU 2001 draws the focus 7004 around only one of the keys on an operation screen, such as the new address input keyboard screen 7001. A button having the focus 7004 drawn therearound is a currently focused button. For example, at the start of the new address input keyboard screen 7001, the CPU 2001 draws the focus 7004 around the "q" button 7011.

When a specific hardware key of the hardware keyboard 2097 is pressed, the CPU 2001 moves the focus 7004 between controls on the screen. When key (control) operation is performed on the hardware keyboard 2097, the CPU 2001 regards the key operation as being performed on the touch panel and executes the same processing as executed when a corresponding button operation is performed on the touch panel. Note that a movement order of the focus 7004 is predefined on an operation screen-by-operation screen basis.

For example, when a "6" key 4016 appearing in FIGS. 4A and 4B is operated, the CPU 2001 moves the focus 7004 in a normal direction i.e. in a forward direction. More specifically, the CPU 2001 moves the focus 7004 onto a next control. For example, when the "6" key 4016 is pressed in the FIG. 6A state, the CPU 2001 moves the focus 7004 onto a "w" button 7012, whereby the screen is brought into a state illustrated in FIG. 6B.

When a "4" key 4014 appearing in FIGS. 4A and 4B is operated, the CPU 2001 moves the focus 7004 in a reverse direction i.e. in a backward direction. More specifically, the CPU 2001 moves the focus 7004 onto the preceding control. For example, when the "4" key 4014 is pressed in the FIG. 6B state, the CPU 2001 moves the focus 7004 onto the "q" button 7011, whereby the screen is brought back into the state illustrated in FIG. 6A.

When a "5" key 4015 appearing in FIGS. 4A and 4B is operated, the CPU 2001 executes the same processing as performed when a button currently associated with the focus 7004 is pressed.

For example, when the "5" key 4015 is pressed in the FIG. 6A state, the CPU 2001 sets an address displayed in an address setting display section 7002 to "abc@abc.co.jpq". On the other hand, when the "5" key 4015 is pressed in the FIG. 6B state, the CPU 2001 sets the address displayed in the address setting display section 7002 to "abc@abc.co.jpw".

When the ID key 4006 appearing in FIGS. 4A and 4B is operated, the CPU 2001 finally sets the address. In a dialog where an "OK" button, a "Next" button, or a "Close" button is displayed, the CPU 2001 executes the same processing as performed when the displayed button is pressed. Further, when the process has been shifted to a special setting mode, such as a numerical value input mode, the CPU 2001 causes the process to exit from the mode. For example, when the ID key 4006 is pressed in the FIG. 6A state, the CPU 2001 sets "abc@abc.co.jpq" as a new e-mail address.

When a "1" key 4011 appearing in FIGS. 4A and 4B is operated, the CPU 2001 performs status check and causes the voice generator 2098 to read aloud the status of the apparatus.

When the "2" key 4012 appearing in FIGS. 4A and 4B is operated, the CPU 2001 reads aloud a screen. More specifically, the CPU 2001 performs control such that the names of all buttons onto which the focus can be moved are read aloud from the currently displayed operation screen. Further, when other focusable objects (sliders, etc.) than the buttons are displayed on the screen, the CPU 2001 performs control such that voice reading is also performed to indicate the existence of those objects. For example, in the FIG. 6A state, the CPU 2001 reads aloud the names of the buttons arranged on the dialog (new address input keyboard screen 7001).

When a "3" key 4013 appearing in FIGS. 4A and 4B is operated, the CPU 2001 stops voice reading. More specifically, when this "3" key 4013 is pressed during voice reading, the CPU 2001 stops the voice reading. Once voice reading has been stopped, the voice reading cannot be restarted from where it was stopped. Further, even if the "3" key 4013 is pressed when voice reading is not being performed, the CPU 2001 executes no processing.

When a "7" key 4017 appearing in FIGS. 4A and 4B is operated, the CPU 2001 reads aloud settings. In the present example, the CPU 2001 reads aloud all of currently configured settings. The settings to be read aloud are associated with an item that can be set by voice reading operation. For example, in the FIG. 6A state, the CPU 2001 reads aloud "abc@abc.co.jpq".

When an "8" key 4018 appearing in FIGS. 4A and 4B is operated, the CPU 2001 performs voice reading again. More specifically, the CPU 2001 reads aloud again an input by the user's operation (the pressing of a button on the touch panel or the pressing of a hardware key) performed immediately before the pressing of the "8" key 4018. However, if the input which was read aloud immediately before the pressing of the "8" key 4018 was not a user's instruction but was an automatic one performed in response to a status change or the like of the image processing apparatus, the CPU 2001 reads aloud i.e. performs voice reading of the status change or the like.

When a "9" key 4019 appearing in FIGS. 4A and 4B is operated, the CPU 2001 performs voice reading of a current location. In the voice reading of the current location, current screen information and the name of a currently focused button are read by voice. For example, in the FIG. 6A state, voice reading of "e-mail address setting screen" and "q" is performed.

When the "?" key 4002 appearing in FIGS. 4A and 4B is operated, the CPU 2001 reads aloud "help" for voice operation. More specifically, the CPU 2001 reads aloud "help (guide)" concerning key assignment for voice reading.

When the "*" key 4004 appearing in FIGS. 4A and 4B is operated, the CPU 2001 reduces volume by one level. Further, when the "#" key 4005 appearing in FIGS. 4A and 4B is operated, the CPU 2001 increases volume by one level. In the present example, it is assumed that the image processing apparatus is provided with six levels of volume, i.e. volume 0 to 5, and the volume level is factory-set to 3 as a default value. If the "0" key 4010 is pressed after the volume is changed, the CPU 2001 returns the volume to the default value of 3.

When some operation is thus performed by the user, the CPU 2001 performs control such that a response to the operation is output by voice from the speaker 2099.

More specifically, the CPU 2001 performs voice reading via the speaker 2099 e.g. when the focus 7004 is moved, when a dialog is opened, when a button is pressed, or when a key for giving an instruction for voice reading is pressed.

For example, when the new address input keyboard screen is started, the CPU 2001 performs control such that messages "This is the e-mail address setting screen." and "No address has been set." (which means that the address setting display section 7002 is empty) are output by voice. Further, the CPU 2001 performs control such that the name "q" of the "q" button 7011 focused when the new address input keyboard screen is started (i.e. the initial position of the focus 7004) is read aloud.

When the "6" key 4016 is pressed in the FIG. 6A state, the CPU 2001 moves the focus 7004 to a position shown in FIG. 6B. As a consequence, the CPU 2001 reads aloud the name "w" of the "w" button 7012 (i.e. the position to which the focus 7004 has been moved). When the "5" key 4015 is pressed in this state, the CPU 2001 sets the address displayed in the address setting display section 7002 to "abc@abc.co.jpw". Therefore, the CPU 2001 reads aloud the address "abc@abc.co.jpw".

When the reset key 4001 is long-pressed in the voice guidance mode, the CPU 2001 reads aloud a voice guidance termination message, followed by terminating the voice guidance mode. Note that the voice guidance mode may be started and terminated by operating a dedicated key or the like.

As described above, in the voice guidance mode, the user can select a button by moving the focus onto the button on the LCD section 2013 and pressing the "5" key 4015. That is, the user can perform the same processing as performed when the button displayed on the LCD section 2013 is directly pressed on the touch panel.

The voice guidance mode described above enables a visually disabled user to operate the image processing apparatus while recognizing the name and function of a focused button.

In addition to the voice guidance mode, the image processing apparatus of the present embodiment is provided with the auto-complete function of searching an address book or input history for a character string having a leading portion thereof matching an entered character string and then adding the remaining portion of the found character string to the entered character string (i.e. completing the entered character string by the found character string). Note that although in the present embodiment, the term "character string" is used, a character string which is entered and a character string added for completing an entered character string may be formed by a single character or a plurality of characters.

In the conventional image processing apparatus, a character string is automatically completed using a portion complementary thereto (a portion following the character string) by the auto-complete function. A visually able user is able to view a completing character string as the complementary portion on a screen and understand what has occurred, even if the user has no knowledge of the auto-complete function. However, if a visually disabled user has no knowledge of the auto-complete function, it is difficult for the user to grasp what has occurred, when a character string is completed using a portion complementary thereto by the auto-complete function.

Further, it is difficult for a visually disabled user to distinguish between an entered character string and a completing character string (complementary portion) added thereto. Therefore, when it is required to correct the completing character string, the user cannot easily recognize a portion of the character string to be deleted for correction.

In the present embodiment, control is performed to prevent the auto-complete function from causing degradation of user-friendliness in a case where a visually disabled user inputs characters.

The image processing apparatus according to the present embodiment performs control such that when the voice guidance mode is disabled, the auto-complete function is enabled, whereas when the voice guidance mode is enabled, the auto-complete function is disabled by default.

This control makes it possible to prevent a visually disabled user from being confused when a character string is automatically completed using a portion complementary thereto.

Further, the image processing apparatus enables the user to select whether to enable or disable the auto-complete function when the voice guidance mode is enabled.

When the voice guidance mode and the auto-complete function are both enabled, voice reading is performed in a manner distinguishable between an entered character string and an added character string complementary thereto. For example, control is performed such that a voice for reading the entered character string is made different from a voice for reading the added complementary character string. This enables the visually disabled user to easily distinguish between the entered portion and the added portion complementary thereto even when the auto-complete function is enabled.

Further, when both the voice guidance mode and the auto-complete function are enabled, if there are a plurality of completing suggestions of character strings each having a leading portion thereof matching an entered character string, control is performed such that the entered character string is not completed for suggestion using one of portions complementary thereto until the number of the completing suggestions of character strings becomes equal to or smaller than a predetermined number. This makes it possible to prevent a long time period from being taken for voice reading of completing suggestions.

First, a description will be given of an operation of the image processing apparatus performed when the voice guidance mode and the auto-complete function are both enabled.

Figure 7:
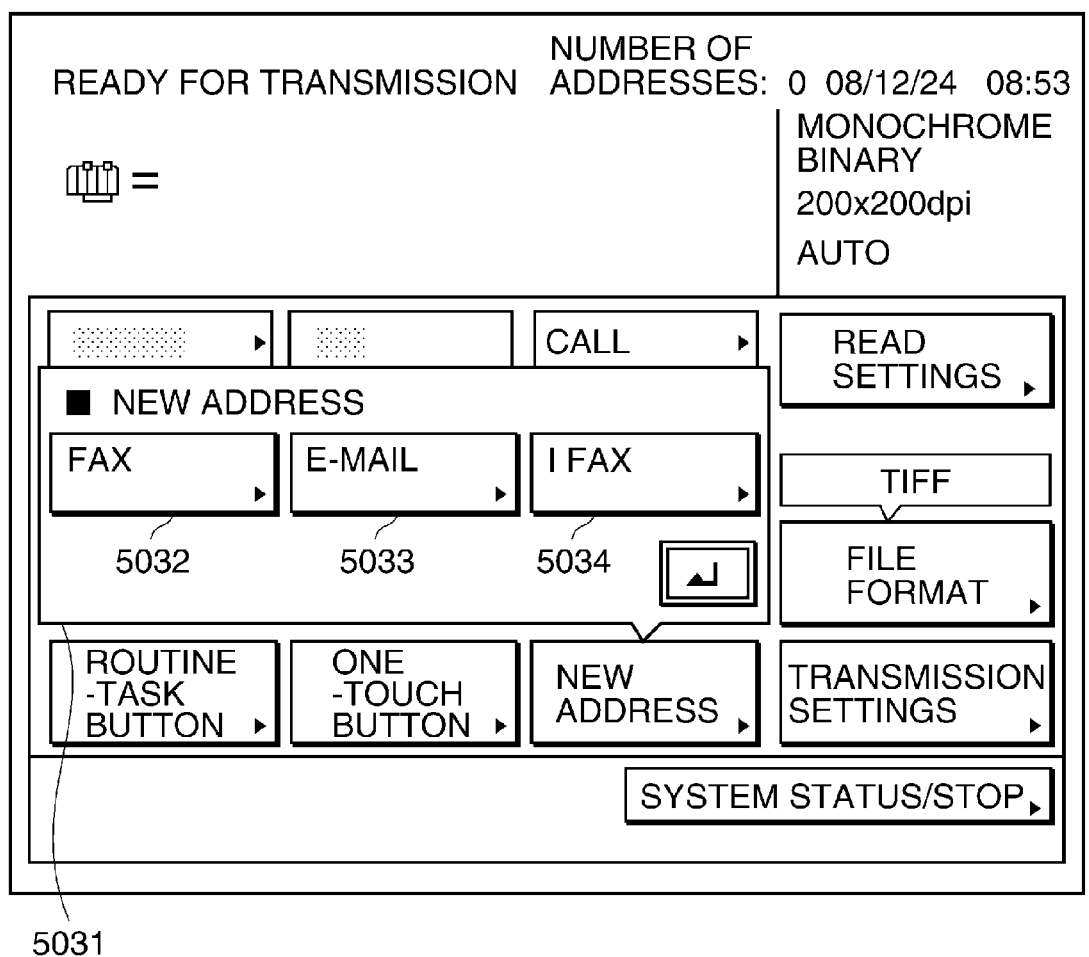
FIG. 7 is a view of an example of a protocol selection screen displayed on the LCD section appearing in FIG. 3.

FIG. 7 is a view of an example of a protocol selection screen displayed on the LCD section 2013 appearing in FIG. 3.

When the user selects "E-MAIL" on the protocol selection screen shown in FIG. 7, input of a new e-mail address is started. As shown in FIG. 7, a protocol selection dialog 5031 displayed on the protocol selection screen comprises a fax selection button 5032, an e-mail selection button 5033, and an I fax (internet fax) selection button 5034.

Figure 8A:
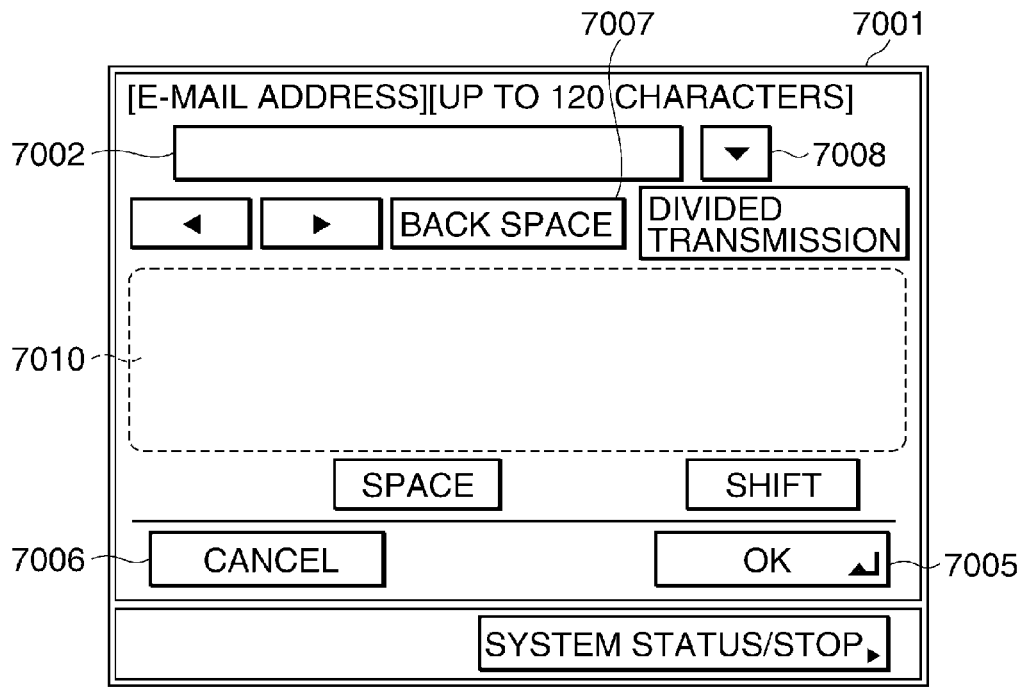
Figure 8B:
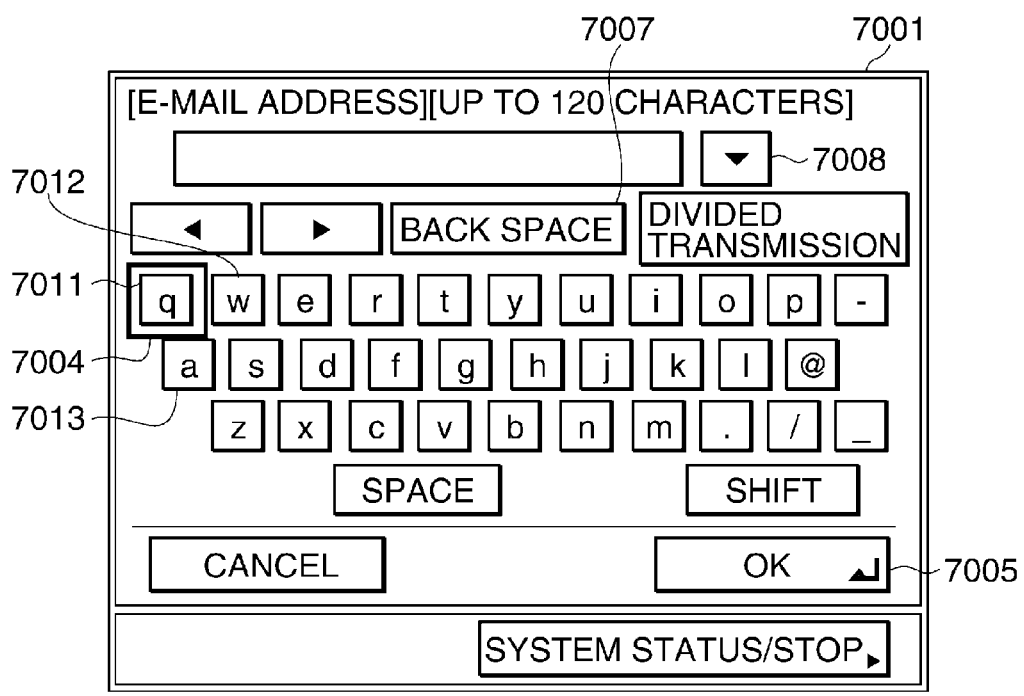

FIGS. 8A and 8B are views useful in explaining the new address input keyboard screen 7001 displayed when the e-mail selection button 5033 appearing in FIG. 7 is pressed. FIG. 8A illustrates an example of the new address input keyboard screen 7001 except for input character button arrays, and FIG. 8B illustrates the example including the input character button arrays displayed in an area 7010 appearing in FIG. 8A (hereafter, the new address input keyboard screen 7001 including the input character button arrays is also referred to as "the software keyboard").

When the user presses the e-mail selection button 5033 on the protocol selection dialog 5031 appearing in FIG. 7, the CPU 2001 displays the new address input keyboard screen 7001 for e-mail shown in FIG. 8A on the LCD section 2013 (see FIG. 3). On the new address input keyboard screen 7001 for e-mail, there are arranged the address setting display section 7002 for displaying an input address, a back space button 7007, and a completing suggestion selection button 7008. Further, on the new address input keyboard screen 7001 for e-mail, there are arranged a cancel button 7006 for canceling settings and closing the screen and an OK button 7005 for finally determining settings and closing the screen.

Within the area 7010, character input buttons for inputting respective characters are arranged in the QWERTY array, as shown FIG. 8B. Note that the new address input keyboard screen 7001 is provided with other buttons than the character input buttons, but description thereof is omitted. In the present example, completing suggestions are searched for from the transmission history 8001 and the address book 8002 both appearing in FIG. 2. In the following description, it is assumed that the following character strings are registered in the transmission history 8001 and the address book 8002:

"albert@abc.com"
"alexander@abc.com"
"alfred@abc.com"
"andrew@abc.com"
"anthony@abc.com"
"benjamin@abc.com"
"charles@abc.com"

First, it is assumed that the focus 7004 is set on an "a" button 7013 with nothing displayed in the address setting display section 7002. When the user presses the "5" key 4015 (see FIGS. 4A and 4B) in this state, a character "a" is entered. Then, the CPU 2001 searches for completing suggestions for the entered character "a".

Specifically, the CPU 2001 determines that out of the character strings registered in the transmission history 8001 and the address book 8002, character strings each having a character "a" as a leading character thereof are completing suggestions. Then, the CPU 2001 selects a first one from the found completing suggestions and displays the selected completing suggestion in the address setting display section 7002 (see FIG. 9B). In this case, the portion added for completion is displayed in reverse video as illustrated in FIG. 9B. Further, since there are a plurality of completing suggestions, selection by the completing suggestion selection button 7008 is enabled.

At this time, the CPU 2001 performs voice guidance for the FIG. 9B state. For example, first, "address, a" is uttered by a female voice, and then "lbert@abc.com" is uttered by a male voice. Further, a message "The character string has been completed using a complementary portion for a tentative suggestion. Five completing suggestions have been found." is uttered by the female voice, whereby the user is notified of the fact that an auto-complete operation has been performed, the completing character string, and the number of the found completing suggestions. Note that the address portion is read aloud character by character.

Now, it is assumed that the user moves the focus 7004 onto an "n" button 7014 in the FIG. 9B state, and then presses the "5" key 4015. In this case, a character "n" is entered anew. Then, the CPU 2001 searches for completing suggestions for a character string formed by adding the character "n" to the preceding character "a". As a consequence, the CPU 2001 changes the display of the address setting display section 7002 into a FIG. 9C state.

In this case as well, "an address, an" is uttered by the female voice, and then "drew@abc.com" is uttered by the male voice. Further, a message "The character string has been completed for a tentative suggestion. Two completing suggestions have been found." is uttered by the female voice.

When the user presses the ID key 4006 at this time, the CPU 2001 finally determines the address "andrew@abc.com" set in the address setting display section 7002, followed by exiting from the new address input screen. At this time point, the finally determined character string is read by voice.

As described above, in the auto-complete operation in the voice guidance mode, a character string entered by a user and a character string added for completion by the auto-complete operation are read by a female voice and a male voice, respectively, in a distinguishable manner. Note that a completing character string (added complementary portion) only has to be read aloud by a method different from a normal voice reading method. For example, if a male voice is normally used, the completing character string is read aloud by a female voice. Further, insofar as the two character strings can be distinguished by sound, the method is not limited to the use of difference in voice timbre, but differences in tone, volume, etc. can also be used. Of course, a method different from the normal voice reading method may be realized by a change in one of voice timbre, tone, and volume, or by a combination of a plurality of changes in any of voice timbre, tone, and volume.

Further, instead of reading aloud a character string entered by a user and a completing character string in a distinguishable manner, a short beep may be made between the uttered character strings such that the two uttered character strings can be distinguished from each other. Alternatively, a message, such as "The following is a completing character string for suggestion.", may be read aloud between the voice of a character string entered by a user and the voice of the completing character string.

Figure 9A:
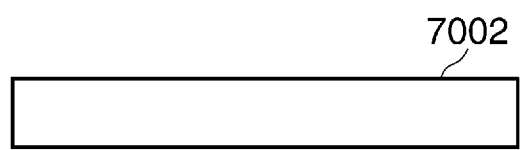
Figure 9B:
Figure 9C:

Now, let it be assumed that the user sets the focus 7004 on the completing suggestion selection button 7008 (see FIG. 8B) and presses the "5" key 4015, when the display on the address setting display section 7002 is in the state illustrated in FIG. 9C.

Figure 10:
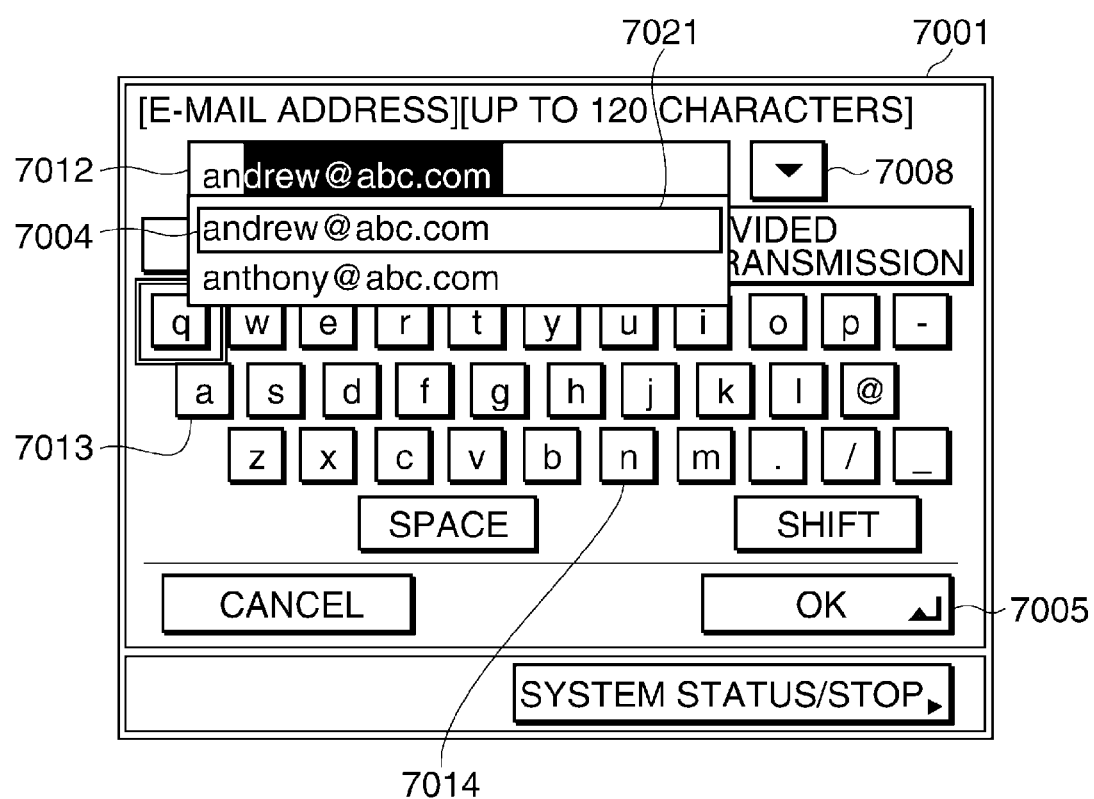
FIG. 10 is a view illustrating an example of a completing suggestion list displayed on the new address input keyboard screen illustrated in FIG. 8A.

FIG. 10 is a view illustrating an example of a completing suggestion list displayed on the new address input keyboard screen 7001 illustrated in FIG. 8A.

When the "5" key 4015 is pressed in the FIG. 9C state as mentioned above, the CPU 2001 displays the completing suggestion list 7021 (see FIG. 10) on the new address input keyboard screen 7001. Then, the CPU 2001 sequentially reads aloud completing suggestions displayed in the completing suggestion list 7021, one by one from an uppermost completing suggestion. The user can set the focus 7004 on a completing suggestion in the completing suggestion list 7021 as illustrated in FIG. 10, to thereby select the completing suggestion.

For example, when the user presses the "6" key 4016 in the FIG. 10 state, the focus 7004 shifts onto a completing suggestion "anthony@abc.com". In this case as well as in the auto-complete mode, the CPU 2001 performs voice reading. More specifically, a character string "an" entered by the user is read aloud by the female voice, and then a completing character string "thony@abc.com" is read aloud by the male voice. When a focus shift occurs while the completing suggestions in the completing suggestion list 7021 are being sequentially read aloud, the CPU 2001 stops the current voice reading, and starts to read aloud a focused character string.

Further, when the user presses the "5" key 4015, the CPU 2001 selects the completing suggestion having the focus 7004 set thereon. When the user presses the ID key 4006 in the state where the completing suggestion has been selected, the CPU 2001 sets the selected completing suggestion in the address setting display section 7002. Note that selection from the completing suggestion list 7021 may be performed without setting the voice-guidance-mode auto-complete use flag 8005.

Figure 9D:
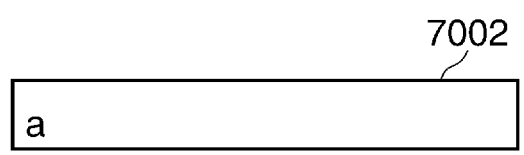

When the voice guidance mode and the auto-complete function are both enabled, whether or not to perform the auto-complete operation may be determined based on the number of completing suggestions. For example, when the number of completing suggestions (completing suggestion conditional count) is limited to three or less, the auto-complete operation is performed as follows:

First, let it be assumed that nothing is displayed in the address setting display section 7002 as shown in FIG. 9A, and the focus 7004 is set on the "a" button 7013. When the user presses the "5" key 4015 in this state, the character "a" is entered. Then, the CPU 2001 searches for completing suggestions based on the entered character "a". In the present example, since the number of completing suggestions is five, the above-mentioned completing suggestion conditional count is not satisfied, and hence the CPU 2001 does not perform the auto-complete operation. More specifically, in this case, the character string appearing in FIG. 9B is not displayed in the address setting display section 7002, but only the character "a" entered by the user is displayed in the address setting display section 7002 as shown in FIG. 9D. In this case, voice reading is performed by a female voice that says "address, a". Note that selection by the completing suggestion selection button 7008 is enabled.

Then, when the user sets the focus 7004 on the "n" button 7014 and presses the "5" key 4015, the character "n" is entered. Since the number of completing suggestions for the character string "an" is two, the CPU 2001 performs the auto-complete operation (see FIG. 9C). Subsequent processing is the same as described hereinbefore.

Note that in a typical example, the completing suggestion conditional count with reference to which it is determined whether or not to perform the auto-complete operation is set to one. In this case, the auto-complete operation is performed only when completing suggestions can be narrowed down to one completing suggestion.

When the voice guidance mode and the auto-complete function are both enabled, the image processing apparatus of the present embodiment carries out the operation described with reference to FIGS. 7 to 9D. This enables a visually disabled user to easily recognize the fact that the auto-complete operation has been performed, what character string has been added for completion, and how many completing suggestions have been found. Further, when the voice guidance mode is enabled, if the number of completing suggestions exceeds a predetermined number, the auto-complete operation is not performed, whereby it is possible to prevent a long time period from being taken for voice reading.

The above description is given of a case where the voice guidance mode and the auto-complete function are both enabled. However, when the voice guidance mode is enabled, it is also possible to disable the auto-complete function.

Next, the control of the image processing apparatus of the present embodiment will be described using flowcharts. In the present example, a process of each of the flowcharts is stored as a program code in the HDD 2004 appearing in FIG. 1. The CPU 2001 loads the program code into the RAM 2002 and then interprets and executes the program code.

Figure 11:
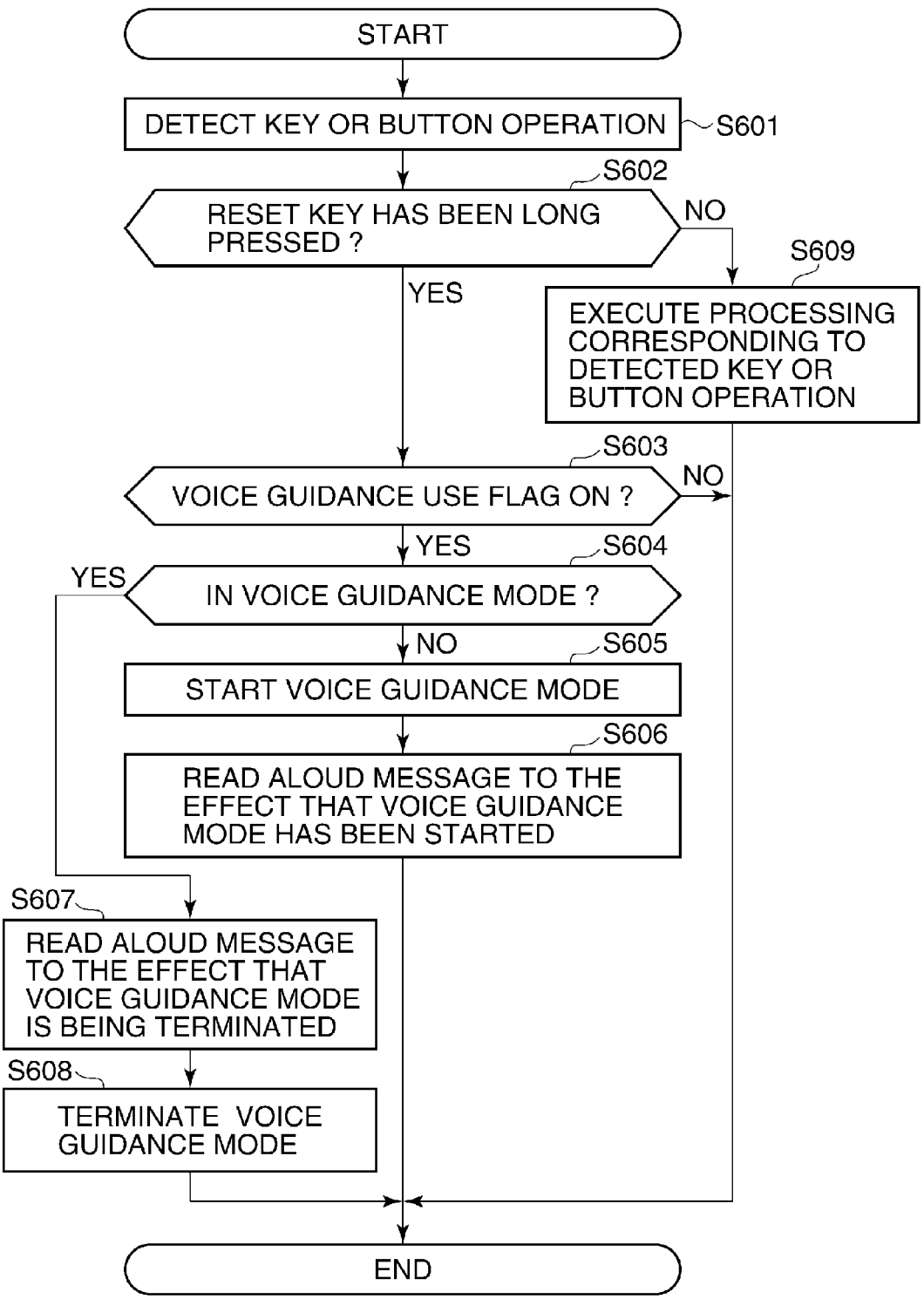
FIG. 11 is a flowchart of a process for starting and terminating the voice guidance mode, which is executed in the image processing apparatus shown in FIG. 1

FIG. 11 is a flowchart of a process for starting and terminating the voice guidance mode, which is executed in the image processing apparatus shown in FIG. 1.

Referring to FIGS. 1, 3, and 11, the CPU 2001 detects a key or button operation performed by the user on the console section 2012 (step S601). Then, the CPU 2001 determines whether or not the reset key 4001 has been long pressed (step S602). If the reset key 4001 has been long pressed (YES to the step S602), the CPU 2001 determines whether or not the voice guidance use flag 8003 has been set (ON) to enable the use of the voice guidance (step S603).

If the voice guidance use flag 8003 has been set (ON) to enable the use of the voice guidance (YES to the step S603), the CPU 2001 determines whether or not the apparatus is in the voice guidance mode (step S604). If it is determined that the apparatus is not in the voice guidance mode (NO to the step S604), the CPU 2001 starts the voice guidance mode (step S605) and outputs a voice message to the effect that the voice guidance mode has been started (step S606), followed by terminating the present process.

If it is determined that the apparatus is in the voice guidance mode (YES to the step S604), the CPU 2001 outputs a voice message to the effect that the voice guidance mode is being terminated (step S607), and then terminates the voice guidance mode (step S608), followed by terminating the present process.

If the voice guidance use flag 8003 has not been set (ON) to enable the use of the voice guidance (NO to the step S603), the CPU 2001 terminates the present process. Further, if the reset key 4001 has not been long pressed (NO to the step S602), the CPU 2001 executes processing corresponding to the detected key or button operation (step S609), followed by terminating the present process.

Thus, according to the process shown in FIG. 11, when the reset key 4001 is long pressed, the voice guidance mode is started.

Figure 12A:
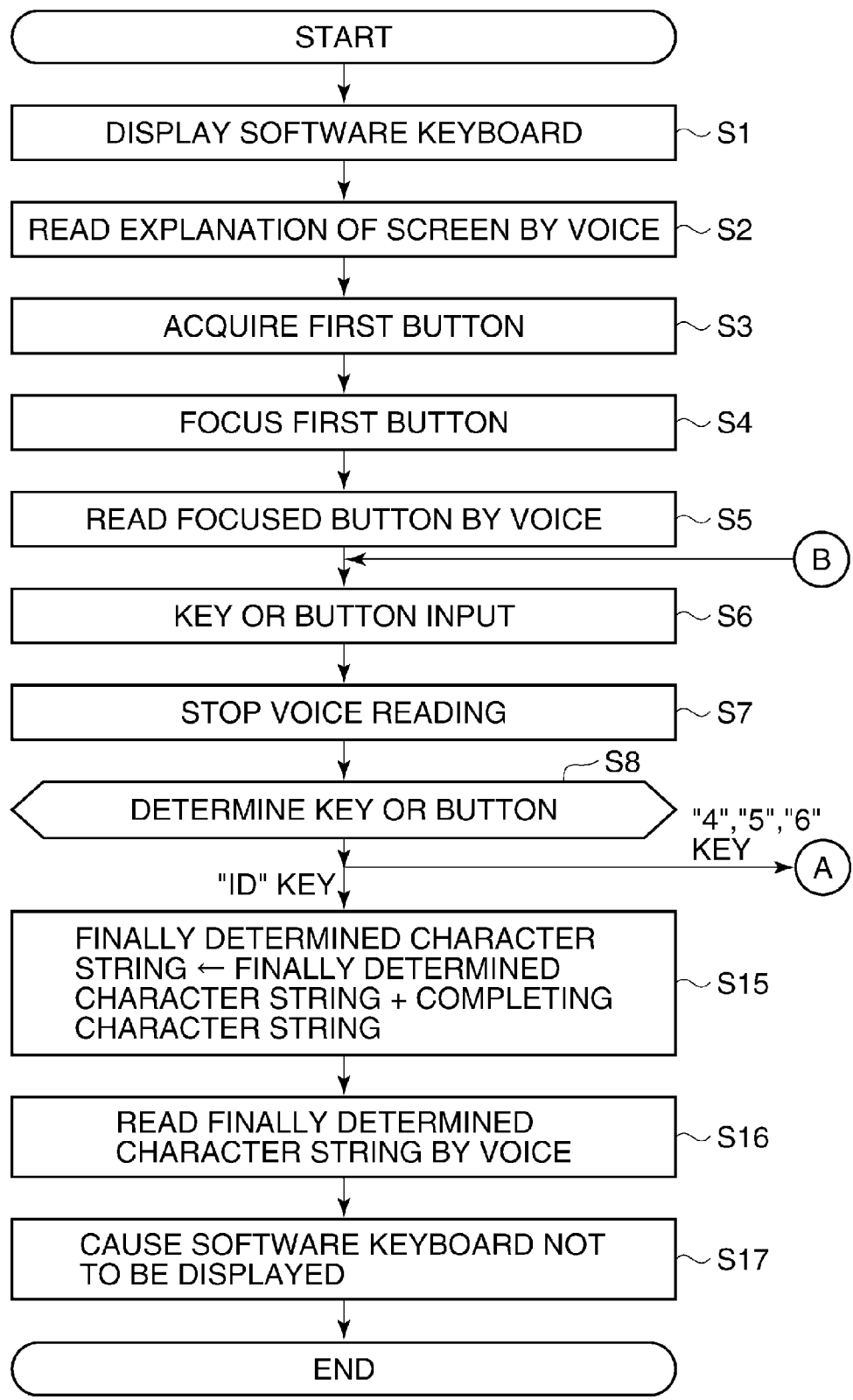
FIGS. 12A and 12B are a flowchart of a process executed by the image processing apparatus shown in FIG. 1 when the e-mail selection button appearing in FIG. 7 is operated.
Figure 12B:
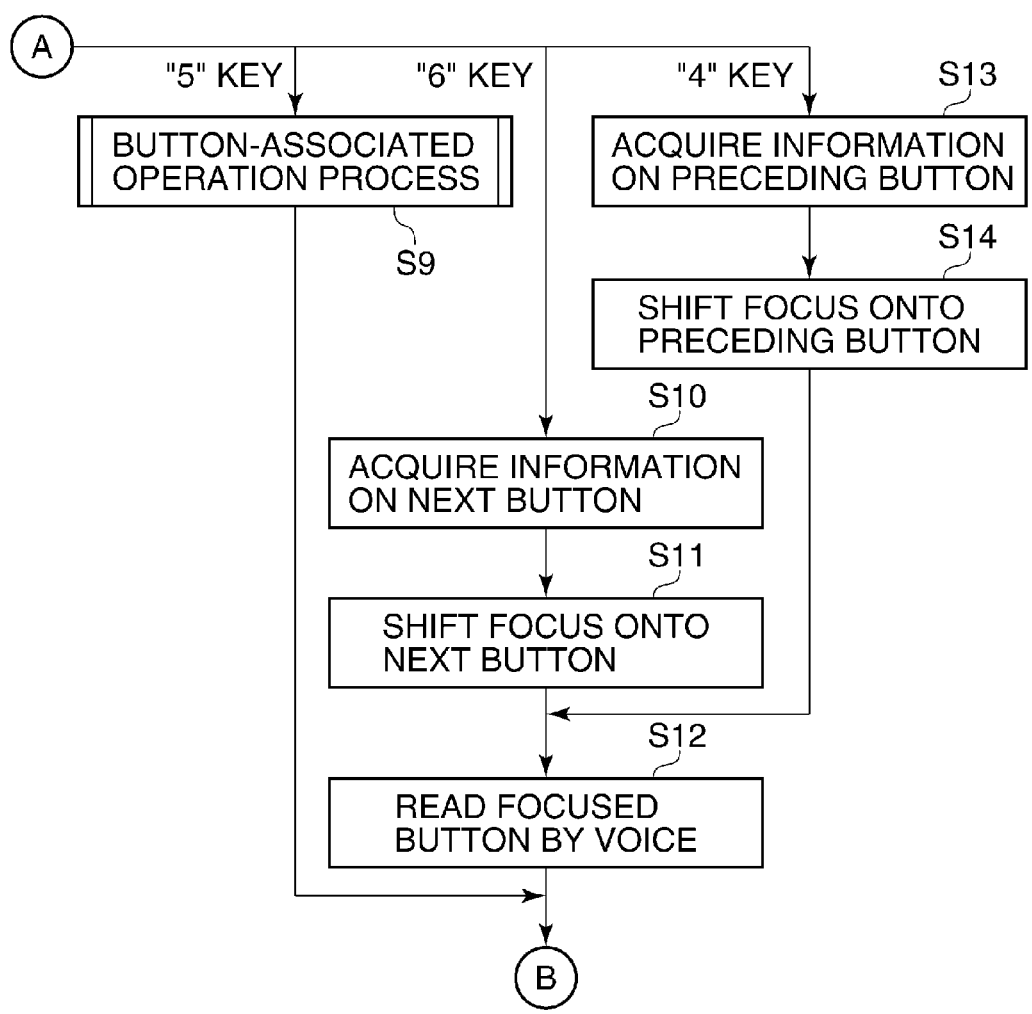

FIGS. 12A and 12B are a flowchart of a process executed when the e-mail selection button 5033 appearing in FIG. 7 is operated in the image processing apparatus shown in FIG. 1.

Referring to FIGS. 1, 3, 7, and 12, let it be assumed that the user presses the e-mail selection button 5033 when the protocol selection screen shown in FIG. 7 is displayed on the LCD section 2013 and the apparatus is in the voice guidance mode. In this case, the CPU 2001 displays the new address input keyboard screen 7001 (software keyboard) on the LCD section 2013 (step S1).

Then, the CPU 2001 reads aloud an explanation of the new address input keyboard screen 7001 by voice (step S2). The CPU 2001 acquires information on a first button to be focused according to a focus movement order set for the new address input keyboard screen 7001 (step S3). Then, the CPU 2001 sets the focus on the first button to be focused and displays the button in the focused state on the LCD section 2013 (step S4). Thereafter, the CPU 2001 reads aloud an explanation of the button on which the focus has been set (step S5).

Upon receipt of a key or button input from the user (step S6) to detect the key or button input, the CPU 2001 stops voice reading (step S7). When voice reading is not being performed, the CPU 2001 does not execute any processing for the present process. Note that in the step S6, if the touch panel on the LCD section 2013 is enabled, a user's operation on the touch panel is also detected. Further, a character input from the hardware keyboard 2097 is also detected.

The CPU 2001 determines a key or button of which the key or button input is detected in the step S6 (step S8). If the key of which the key or button input is detected is the "5" key 4015, the CPU 2001 executes a button-associated operation process according to the focused button (step S9), followed by returning the process to the step S6.

If the key or button of which the key or button input is detected is the "6" key 4016, the CPU 2001 acquires information on a next button according to the focus movement order set for the new address input keyboard screen 7001 (step S10). The CPU 2001 moves the focus onto the next button (step S11). Then, the CPU 2001 reads aloud an explanation of the focused next button (step S12), followed by returning the process to the step S6.

If the key or button of which the key or button input is detected is the "4" key 4014, the CPU 2001 acquires information on a preceding button according to the focus movement order set for the new address input keyboard screen 7001 (step S13). The CPU 2001 moves the focus onto the preceding button (step S14). Then, the CPU 2001 reads aloud an explanation of the focused preceding button (step S12), followed by returning the process to the step S6.

If the key or button of which the key or button input is detected is the ID key 4006, the CPU 2001 adds what is set as the completing character string 8007 to a character string set as the finally determined character string 8006, and records the newly formed character string as the finally determined character string 8006 (step S15). In the address setting display section 7002 are displayed a character string finally determined by the user's operation and a character string added for completion, as described hereinafter. In the present example, the entire character string displayed in the address setting display section 7002 is set as the finally determined character string. Finally, what is set as the finally determined character string 8006 forms a result (new address) of processing performed using the new address input keyboard screen 7001. Then, the CPU 2001 performs voice reading of the finally determined character string (step S16). Thereafter, the CPU 2001 terminates the present process by causing the software keyboard not to be displayed (step S17).

Although not shown in FIGS. 12A and 12B, the CPU 2001 also performs key or button determination on an operated key or button and executes processing corresponding thereto, for each of the other keys and buttons than the "5" key 4015, the "6" key 4016, the "4" key 4014, and the ID key 4006.

Figure 13:
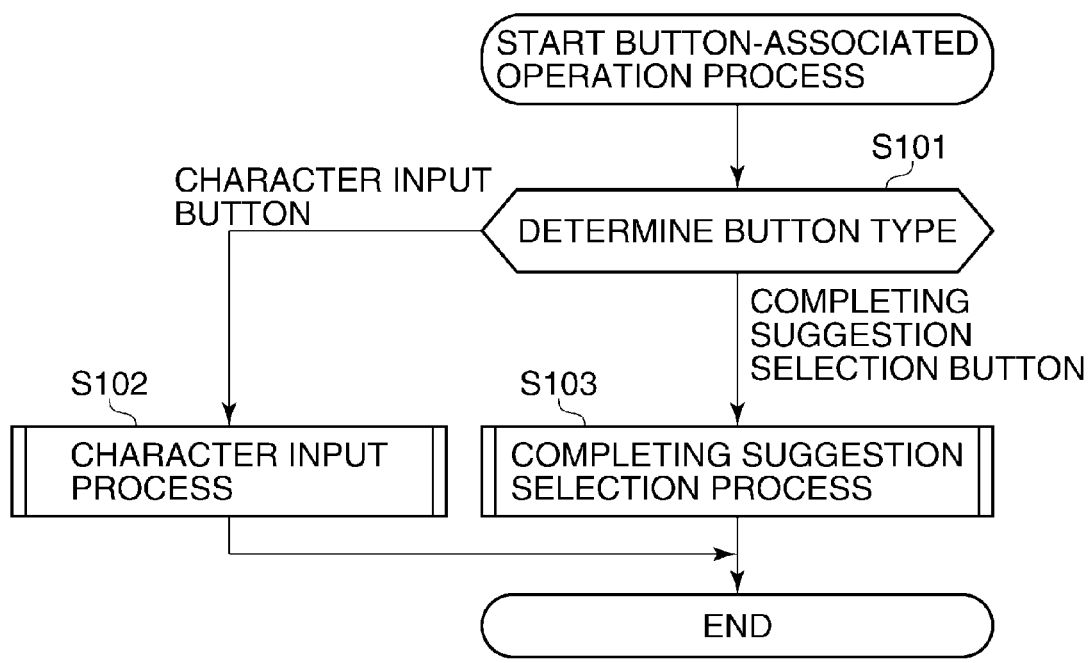
FIG. 13 is a flowchart (subroutine) of a button-associated operation process executed in a step appearing in FIG. 12B.

FIG. 13 is a flowchart (subroutine) of the button-associated operation process executed in the step S9 appearing in FIG. 12B.

Referring to FIG. 13, when the button-associated operation process is started, the CPU 2001 performs button type determination (step S101) first. If the focused button is a character input button in the area 7010, the CPU 2001 executes a character input process (step S102). On the other hand, if the focused button is the completing suggestion selection button 7008, the CPU 2001 executes a completing suggestion selection process (step S103), followed by terminating the button-associated operation process. The character input process executed in the step S102 and the completing suggestion selection process executed in the step S103 will be described hereinafter.

Note that although illustration in the flowchart in FIG. 13 is omitted, if the OK button 7005 is focused in the button-associated operation process, the CPU 2001 executes the same processing as performed in the steps S15 to S17 described with reference to FIG. 12A. Further, if the cancel button 7006 is focused, the CPU 2001 cancels the finally determined character string, followed by closing the new address input keyboard screen 7001. Similarly, when any of the other buttons arranged on the new address input keyboard screen 7001 is focused, the CPU 2001 executes the same processing as described hereinbefore.

Thus, the user can perform operation on the screen by moving the focus from one button to another while listening to the guidance.

Figure 14:
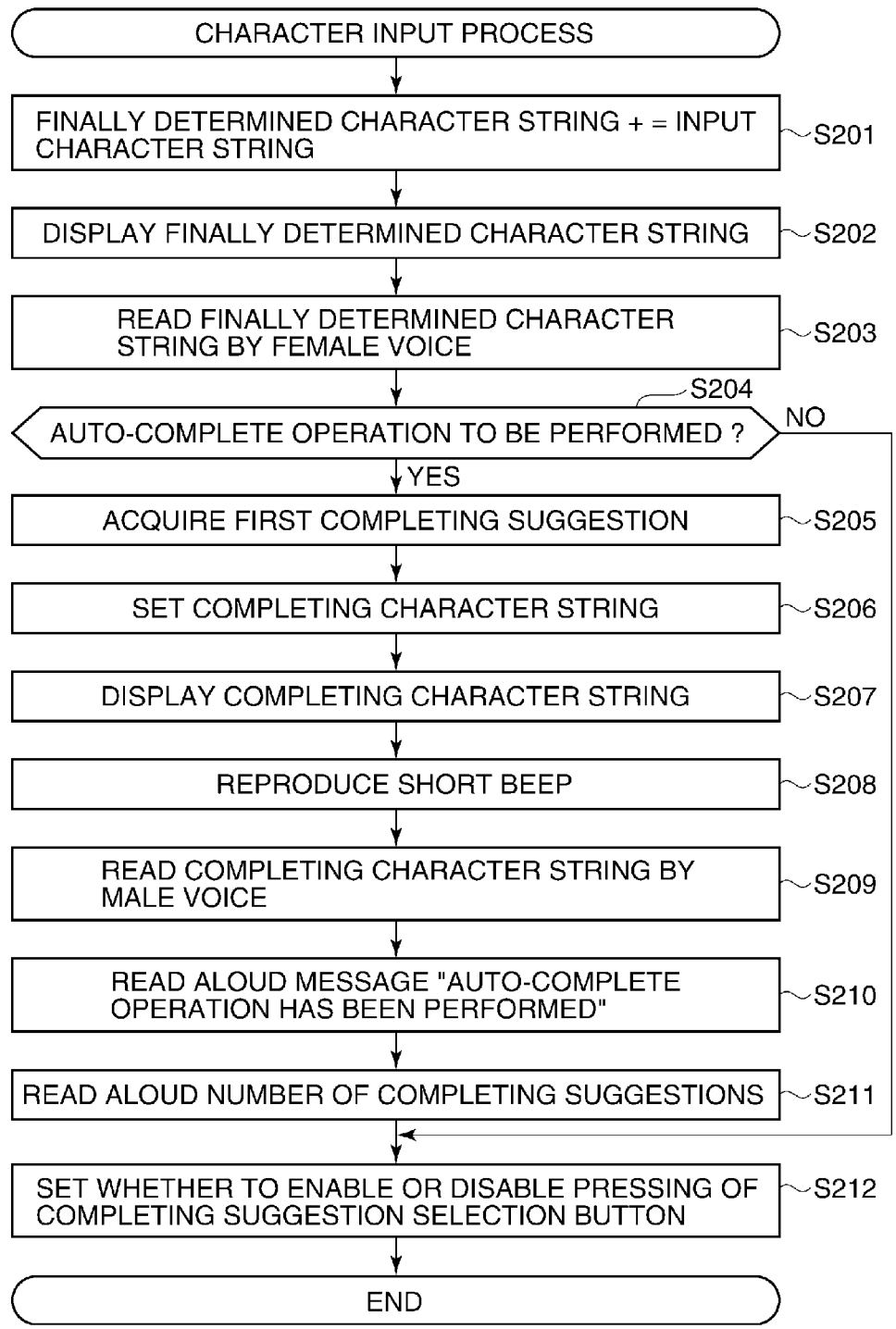
FIG. 14 is a flowchart (subroutine) of a character input process executed in a step appearing in FIG. 13.

FIG. 14 is a flowchart (subroutine) of the character input process executed in the step S102 of the FIG. 13 process.

Referring to FIGS. 1 and 14, when the character input process is started, the CPU 2001 inputs or adds an entered character to the finally determined character string 8006 (step S201). More specifically, a character of a character input button focused on the new address input keyboard screen 7001 is input or added to the finally determined character string 8006.

Then, the CPU 2001 displays what is set as the finally determined character string 8006, in the address setting display section 7002 (step S202). Then, the CPU 2001 reads aloud what is set as the finally determined character string 8006 by a female voice (step S203). The CPU 2001 determines whether or not to perform the auto-complete operation (step S204) by executing an auto-completion execution-determining process.

Figure 15:
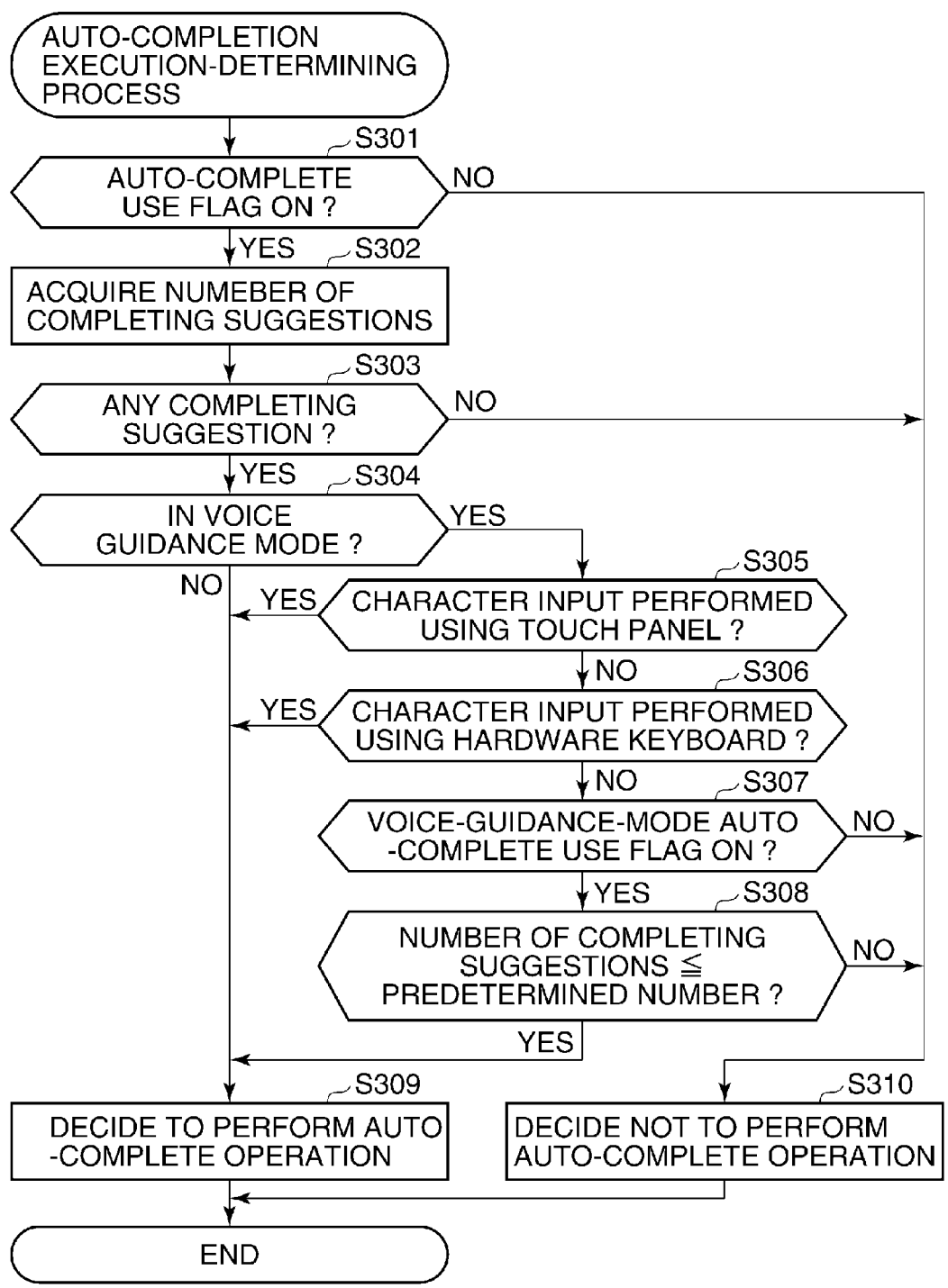
FIG. 15 is a flowchart of an auto-completion execution-determining process executed in a step appearing in FIG. 14.

FIG. 15 is a flowchart of the auto-completion execution-determining process executed in the step S204 of the FIG. 14 process.

Referring to FIGS. 1 and 15, when the auto-completion execution-determining process is started, the CPU 2001 determines whether or not the auto-complete use flag 8004 has been set (ON) to enable the use of the auto-complete function (step S301). If the auto-complete use flag 8004 has been set (ON) to enable the use of the auto-complete function (YES to the step S301), the CPU 2001 acquires the number of completing suggestions (step S302). For example, the CPU 2001 acquires the number of addresses each having a leading portion thereof matching the character string set as the finally determined character string 8006, which addresses are stored in the transmission history 8001 and the address book 8002.

Then, the CPU 2001 determines whether or not there is any completing suggestion (i.e. whether the number of completing suggestions acquired in the step S302 is not less than 1) (step S303). If it is determined that there is at least one completing suggestion (YES to the step S303), the CPU 2001 determines whether or not the apparatus is in the voice guidance mode (step S304). If it is determined that the apparatus is in the voice guidance mode (YES to the step S304), the CPU 2001 determines whether or not the character input has been performed by direct pressing by the user on the touch panel (step S305).

If it is determined that the character input has not been performed by direct pressing by the user on the touch panel (NO to the step S305), the CPU 2001 determines whether or not the character input has been performed using the hardware keyboard 2097 (step S306). If it is determined that the character input has not been performed using the hardware keyboard 2097 (NO to the step S306), the process proceeds to a step S307. In other words, the process proceeds from the step S306 to the step S307 when character input is performed by operating one of the hardware keys of the ten-key pad 2019 of the console section 2012. In the step S307, the CPU 2001 determines whether or not the voice-guidance-mode auto-complete use flag 8005 has been set (ON) to enable the use of the auto-complete function in the voice guidance mode.

If the voice-guidance-mode auto-complete use flag 8005 has been set (ON) to enable the use of the auto-complete function in the voice guidance mode (YES to the step S307), the CPU 2001 determines whether or not the number of completing suggestions acquired in the step S302 is not more than a predetermined number (step S308). The predetermined number may be a value coded in a program or a value designated by the user and stored in the RAM 2002 or the HDD 2004.

If the number of completing suggestions is not more than the predetermined number (YES to the step S308), the CPU 2001 decides to perform the auto-complete operation (step S309), followed by terminating the auto-completion execution-determining process. On the other hand, if the number of completing suggestions exceeds the predetermined number (NO to the step S308), the CPU 2001 decides not to perform the auto-complete operation. In other words, the CPU 2001 inhibits the auto-complete function (step S310). Then, the CPU 2001 terminates the auto-completion execution-determining process.

If it is determined in the step S307 that the voice-guidance-mode auto-complete use flag 8005 has not been set (ON), i.e. the use of the auto-complete function in the voice guidance mode is disabled (NO to the step S307), the process proceeds to the step S310, and the CPU 2001 decides not to perform the auto-complete operation, followed by terminating the auto-completion execution-determining process.

If it is determined in the step S306 that the character input has been performed using the hardware keyboard 2097 (YES to the step S306), the process proceeds to the step S309, and the CPU 2001 decides to perform the auto-complete operation, followed by terminating the auto-completion execution-determining process.

If it is determined in the step S305 that the character input has been performed by direct pressing by the user on the touch panel (YES to the step S305), the process proceeds to the step S309, and the CPU 2001 decides to perform the auto-complete operation, followed by terminating the auto-completion execution-determining process.

If it is determined in the step S304 that the apparatus is not in the voice guidance mode (NO to the step S304), the process proceeds to the step S309, and the CPU 2001 decides to perform the auto-complete operation, followed by terminating the auto-completion execution-determining process.

If it is determined in the step S303 that there is no completing suggestion (NO to the step S303), the process proceeds to the step S310, and the CPU 2001 decides not to perform the auto-complete operation, followed by terminating the auto-completion execution-determining process.

If it is determined in the step S301 that the auto-complete use flag 8004 has not been set (ON), i.e. the use of the auto-complete function is disabled (NO to the step S301), the process proceeds to the step S310, and the CPU 2001 decides not to perform the auto-complete operation, followed by terminating the auto-completion execution-determining process.

Referring again to FIGS. 1 and 14, if the CPU 2001 decides to perform the auto-complete operation (YES to the step S204), the CPU 2001 acquires a first completing suggestion (step S205). More specifically, in the step S205, the CPU 2001 acquires one address having a leading portion thereof matching the finally determined character string 8006 from the addresses stored in the transmission history 8001 and the address book 8002. If there are a plurality of completing suggestions, the CPU 2001 selects one from the completing suggestions based on a criterion, such as "first-found completing suggestion", "first completing suggestion in alphabetical order", or "most recently used completing suggestion". In the present example, "first completing suggestion in alphabetical order" is used as the criterion.

Then, the CPU 2001 sets as the completing character string 8007 a character string formed by excluding a portion corresponding to the finally determined character string 8006 from the first completing suggestion (step S206). The CPU 2001 displays the character string set as the completing character string 8007 as a portion following the finally determined character string displayed in the step S202 (step S207). In the present example, the completing character string is displayed in a manner color-reversed from the finally determined character string.

Then, the CPU 2001 reproduces, for example, the sound of a short beep (step S208). Then, the CPU 2001 reads aloud the character string set as the completing character string 8007 by a male voice (step S209). Further, the CPU 2001 reads, by a female voice, a message to the effect that the auto-complete operation has been performed (step S210). Thereafter, the CPU 2001 reads aloud the number of completing suggestions acquired in the step S302 by a female voice (step S211).

Then, the CPU 2001 sets whether to enable or disable the pressing of the completing suggestion selection button 7008 (step S212), followed by terminating the character input process. In the step S212, when the number of completing suggestions is not less than 1, the CPU 2001 enables the pressing of the completing suggestion selection button 7008, and otherwise, the CPU 2001 disables the same. In doing this, the same determination processing as executed in the step S308 described with reference to FIG. 15 may be performed, whereby when the number of completing suggestions exceeds a predetermined number, the pressing of the completing suggestion selection button 7008 may be disabled.

Note that in the voice guidance mode, it is possible to disable the pressing of the completing suggestion selection button 7008 by removing the completing suggestion selection button 7008 from the focus movement order set for the new address input keyboard screen 7001. Alternatively, an attribute for indicating that the pressing has been disabled may be added to the completing suggestion selection button 7008. In this case, when the "5" key 4015 is pressed with the completing suggestion selection button 7008 focused, the CPU 2001 notifies the user that the pressing of the completing suggestion selection button 7008 has been disabled.

If the CPU 2001 decides not to perform the auto-complete operation (NO to the step S204), the process proceeds to the step S212, and the CPU 2001 sets whether to enable or disable the pressing of the completing suggestion selection button 7008, followed by terminating the character input process.

Figure 16A:
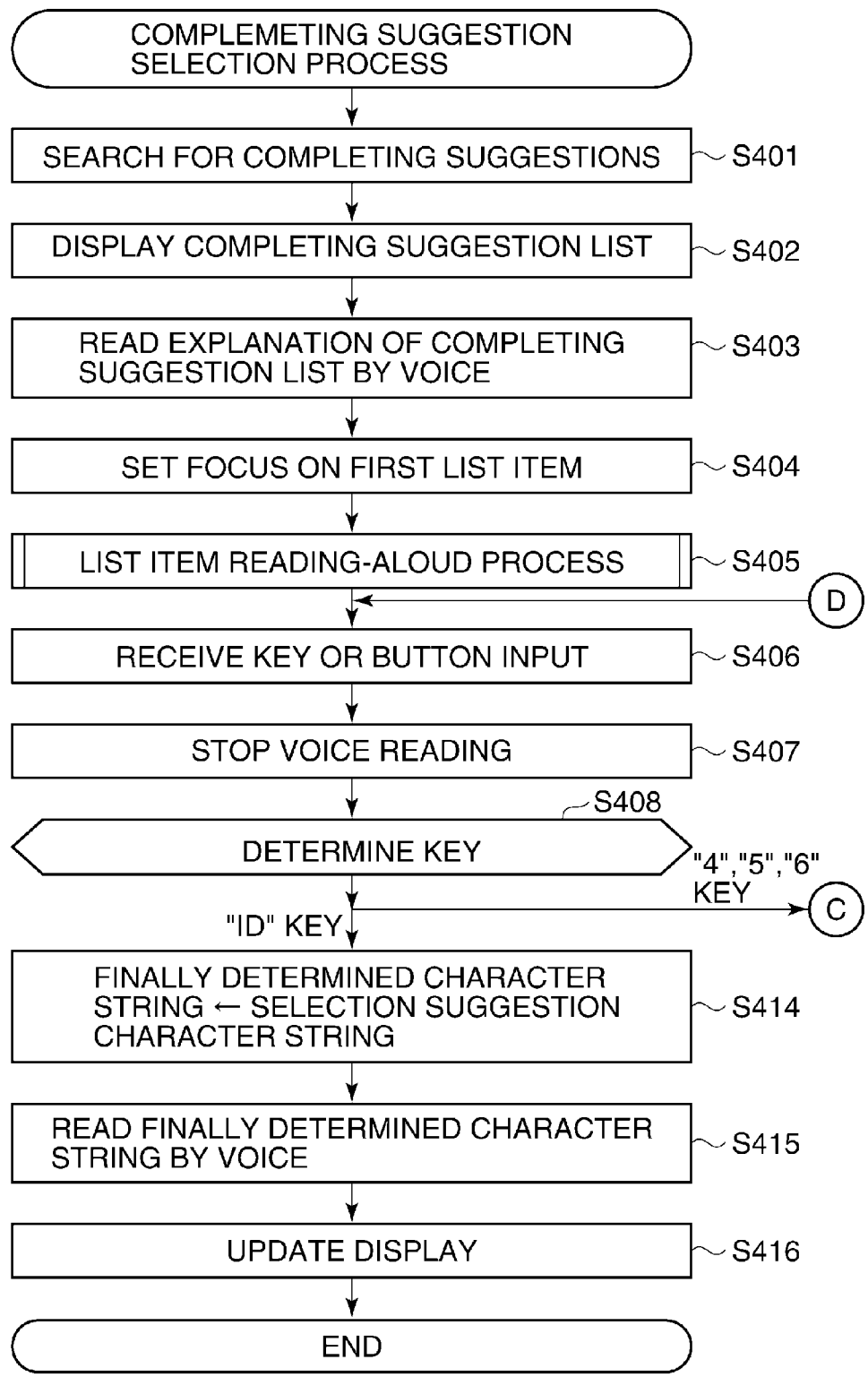
FIGS. 16A and 16B are a flowchart of a completing suggestion selection process executed in a step appearing in FIG. 13.
Figure 16B:
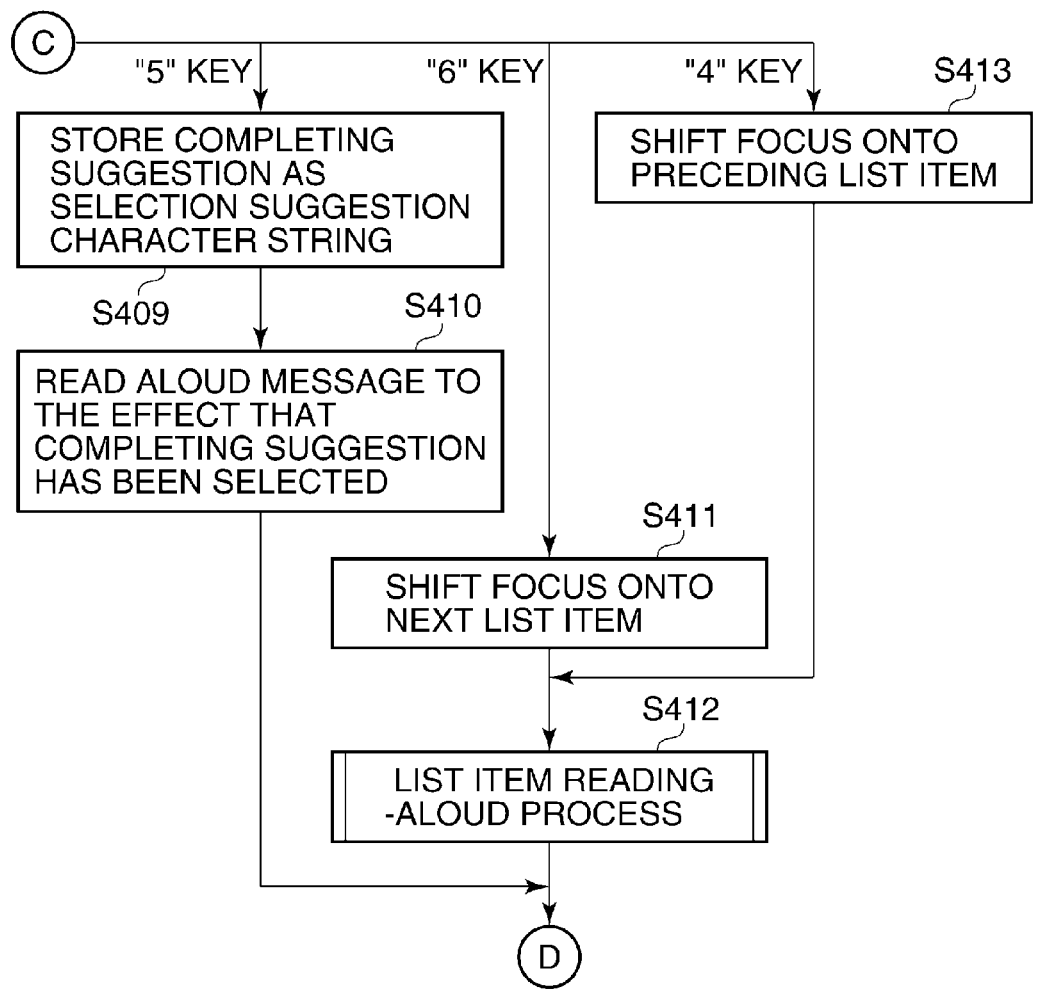

FIGS. 16A and 16B are a flowchart of the completing suggestion selection process executed in the step S103 appearing in FIG. 13.

Referring to FIGS. 1, 16A and 16B, when the completing suggestion selection process is started, the CPU 2001 searches for completing suggestions (step S401). In the step S401, the CPU 2001 acquires addresses from the transmission history 8001 and the address book 8002, each of which has a leading portion thereof matching the finally determined character string 8006.

Then, the CPU 2001 displays the completing suggestions acquired in the step S401 on the LCD section 2013 in a list form (step S402). Specifically, the CPU 2001 displays the completing suggestion list 7021, with the completing suggestions set as list items, on the LCD section 2013, as described with reference to FIG. 10. The CPU 2001 reads an explanation of the completing suggestion list 7021 by voice (step S403). Then, the CPU 2001 focuses a first list item in the completing suggestion list 7021 (step S404), and then performs a list item reading-aloud process for reading aloud the focused list item (step S405).

Figure 17:
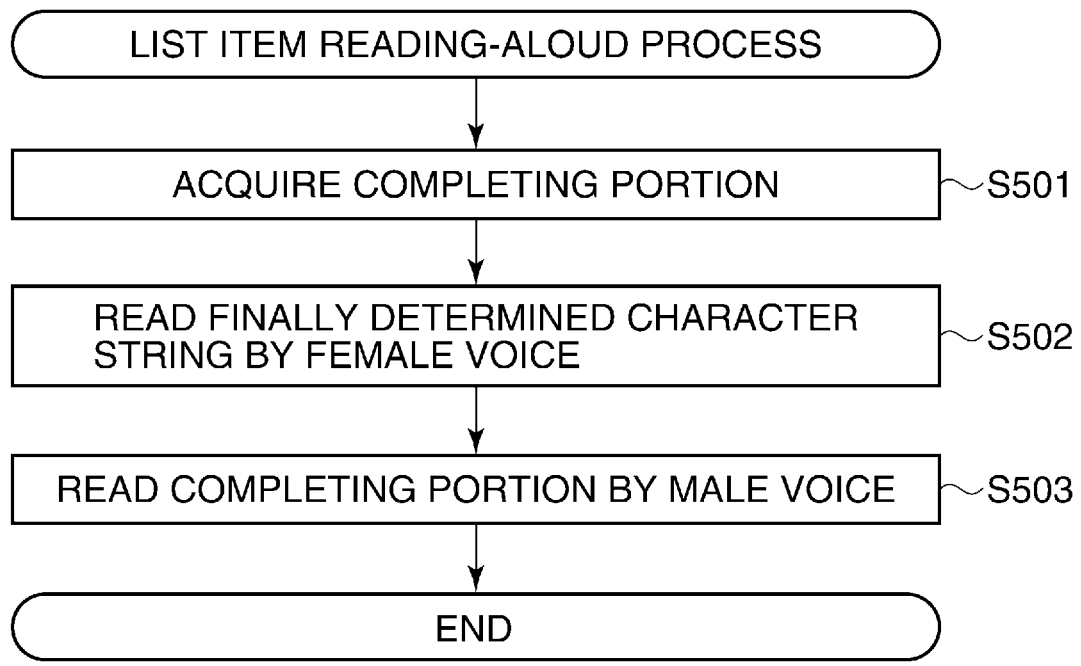
FIG. 17 is a flowchart of a list item reading-aloud process executed in each of steps appearing respectively in FIGS. 16A and 16B.

FIG. 17 is a flowchart of a list item reading-aloud process executed in each of the steps S405 and S412 appearing respectively in FIGS. 16A and 16B.

Referring to FIGS. 1 and 17, when the list item reading-aloud process is started, the CPU 2001 acquires a completing portion to be added, from a focused list item (step S501). Specifically, the CPU 2001 acquires a character string formed by excluding a portion corresponding to the finally determined character string 8006 from a completing suggestion set as the focused list item.

Then, the CPU 2001 reads aloud the character string set as the finally determined character string 8006, by a female voice (step S502). Thereafter, the CPU 2001 reads aloud the completing portion acquired in the step S501, by a male voice (step S503), followed by terminating the list item reading-aloud process.

Referring again to FIGS. 1, 16A and 16B, upon receipt of a key or button input from the user (step S406) to detect the key or button input (step S407), the CPU 2001 stops voice reading (step S407). The CPU 2001 determines a key or button of which the key or button input is detected in the step S406 (step S408). If the key or button of which the key or button input is detected is the "5" key 4015, the CPU 2001 stores the completing suggestion set in the focused list item as the selection suggestion character string 8008 (step S409). Thereafter, the CPU 2001 reads by voice a message to the effect that the completing suggestion set in the focused list item has been selected (step S410), followed by returning the process to the step S406.

If the key or button of which the key or button input is detected is the "6" key 4016, the CPU 2001 moves the focus onto a next list item (step S411). Then, the CPU 2001 executes the list item reading-aloud process for reading aloud the focused list item by voice (step S412), followed by returning the process to the step S406.

If the key or button of which the key or button input is detected is the "4" key 4014, the CPU 2001 moves the focus onto the preceding list item (step S413). Then, the process proceeds to the step S412, and the CPU 2001 reads the focused list item by voice, followed by returning the process to the step S406.

Although not shown in FIGS. 16A and 16B, the CPU 2001 performs key or button determination on an operated key or button and executes processing corresponding thereto, for each of the other keys and buttons than the "5" key 4015, the "6" key 4016, the "4" key 4014, and the ID key 4006. Also, when the character input received in the step S406 has been performed using the touch panel or the hardware keyboard 2097, processing corresponding to the character input is selected and executed.

If it is determined in the step S408 that the operated key is the ID key 4006, the CPU 2001 sets what is set as the selection suggestion character string 8008 as the finally determined character string 8006 (step S414). Then, the CPU 2001 reads aloud the character string set as the finally determined character string 8006 (step S415). Further, the CPU 2001 causes the completing suggestion list 7021 not to be displayed, and displays the character string set as the finally determined character string 8006, in the address setting display section 7002 (step S416: display update). Thereafter, the CPU 2001 terminates the completing suggestion selection process.

In the above-described embodiment, the CPU 2001 determines in the step S307 whether or not the voice-guidance-mode auto-complete use flag 8005 has been set (ON) to enable the use of the auto-complete function in the voice guidance mode. However, when the answer to the question of the step S306 is negative (NO), the process may proceed to the step S310 without execution of the steps S307 and S308. In this case, when the voice guidance mode is in operation, the image processing apparatus disables the auto-complete function to thereby perform control such that a character string cannot be automatically completed using a portion complementary thereto. This makes it possible to prevent a visually disabled user from being confused by automatic completion of a character string.

As described above, according to the image processing apparatus of the present embodiment, when the voice guidance mode is disabled, the auto-complete function is enabled, whereby an input character string is completed using, as a portion complementary thereto, a portion of a character string having a leading portion thereof matching the input character string and is displayed. This enables a visually able user to easily input a desired character string.

On the other hand, when the voice guidance mode is enabled, the image processing apparatus disables the auto-complete function to thereby perform control such that a character string cannot be automatically completed using a portion complementary thereto. Thus, the image processing apparatus can prevent a visually disabled user from being confused by automatic addition of a character string.

Further, when the voice guidance mode is enabled, it is possible to selectively set whether to enable or disable the auto-complete function.

Furthermore, when the voice guidance mode and the auto-complete function are both enabled, a character string input by the user and a character string added by the image processing apparatus are read aloud by respective voices different in voice timbre. This enables a visually disabled user not only to recognize that a character string has been completed using a portion complementary thereto by the auto-complete function, but also easily distinguish between a character string input by the user him/herself and an added character string.

What is more, the auto-complete operation is not performed until the number of completing suggestions becomes not more than a predetermined number. This makes it possible to prevent a long time period from being taken for voice reading for a large number of completing suggestions.

Although in the above description, the image processing apparatus is described as an example of the character input apparatus, the character input apparatus may be e.g. a personal computer or a like other electronic apparatus.

Although the present invention has been described above based on the embodiment, the present invention is not limited to the above-described embodiment, but the invention encompass various forms insofar as they do not depart from the spirit and scope thereof.

For example, it is possible to cause a computer provided in the character input apparatus to perform the function of the above-described embodiment as a control method. Further, it is possible to cause the computer provided in the character input apparatus to execute a program having the function of the above-described embodiment.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to the exemplary embodiment, it is to be understood that the invention is not limited to the disclosed exemplary embodiment. The scope of the following claims is to be accorded the broadest interpretation so as to encompass all such modifications and equivalent structures and functions.

This application claims priority from Japanese Patent Application No. 2010-221785 filed Sep. 30, 2010, which is hereby incorporated by reference herein in its entirety.

What is claimed is:

1. A character input apparatus comprising:
   a completing unit configured to determine, based on a character string formed by at least one character, which is input by a user, a character string formed by at least one character which is to be input as a portion following the character string input by the user, and complete the character string input by the user, by adding the determined character string as a portion complementary thereto;
   a voice guidance setting unit configured to set to perform voice guidance for reading aloud a character which has been input by the user; and
   a control unit configured to control the completing unit to perform completion of the input character string if the voice guidance setting unit does not set to perform the voice guidance, and to control the completing unit not to perform completion of the input character string if the voice guidance setting unit sets to perform the voice guidance.

2. The character input apparatus according to claim 1, further comprising a setting unit configured to set to perform the completion of the input character string, by the completing unit, and
   wherein if the voice guidance setting unit sets to perform the voice guidance and the setting unit sets not to perform the completion of the input character string, the control unit controls the completing unit not to perform the completion of the input character string, and
   wherein if the voice guidance setting unit is sets to perform the voice guidance and the setting unit sets to perform the completion of the input character string, the control unit controls the completing unit to perform the completion of the input character string.

3. The character input apparatus according to claim 2, further comprising a voice control unit configured to be operable when the setting unit sets to perform the completion of the input character string, to read aloud the character string input by the user and the character string added by the completing unit in a manner distinguishable therebetween.

4. The character input apparatus according to claim 3, wherein when the setting unit sets to perform the completion of the input character string, said voice control unit reads aloud the character string input by the user and the character string added by the completing unit, by respective voices different in one of sound timbre, tone, and volume.

5. The character input apparatus according to claim 3, wherein when the setting unit sets to perform the completion of the input character string, and when the number of character completing suggestions each as the character string determined based on the character string input by the user is not larger than a predetermined number, said control unit controls the completing unit to perform the completion of the input character string, and
   when the setting unit sets to perform the completion of the input character string and when the number of character completing suggestions each as the character string determined based on the character string input by the user is larger than the predetermined number, said control unit controls the completing unit not to perform the completion of the input character string.

6. A method of controlling a character input apparatus, comprising:
   determining, based on a character string formed by at least one character, which is input by a user, a character string formed by at least one character which is to be input as a portion following the character string input by the user, and completing the character string input by the user, by adding the determined character string as a portion complementary thereto;
   setting, via one or more processors, to perform voice guidance for reading aloud a character which has been input by the user; and
   controlling to perform completion of the input character string if it is not set to perform the voice guidance, and controlling not to perform completion of the input character string if it is set to perform the voice guidance.

7. A non-transitory computer-readable storage medium storing a computer-executable program for causing a computer to execute a method of controlling a character input apparatus,
   wherein the method comprises:
   determining, based on a character string formed by at least one character, which is input by a user, a character string formed by at least one character which is to be input as a portion following the character string input by the user, and completing the character string input by the user, by adding the determined character string as a portion complementary thereto;
   setting to perform voice guidance for reading aloud a character which has been input by the user; and
   controlling to perform completion of the input character string if it is not set to perform the voice guidance, and controlling not to perform completion of the input character string, if it is set to perform the voice guidance.

* * * * *